US010904868B2

(12) United States Patent
Lei et al.

(10) Patent No.: US 10,904,868 B2
(45) Date of Patent: Jan. 26, 2021

(54) MULTI-LAYER RESOURCE SPREAD MULTIPLE ACCESS WITH PERMUTED POWER SCALING AND PHASE ROTATION

(71) Applicant: QUALCOMM Incorporated, San Diego, CA (US)

(72) Inventors: Jing Lei, San Diego, CA (US); Seyong Park, San Diego, CA (US); Joseph Binamira Soriaga, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/374,553

(22) Filed: Apr. 3, 2019

(65) Prior Publication Data

US 2019/0313402 A1 Oct. 10, 2019

Related U.S. Application Data

(60) Provisional application No. 62/654,053, filed on Apr. 6, 2018.

(51) Int. Cl.
*H04W 72/04* (2009.01)
*H04L 27/20* (2006.01)
(Continued)

(52) U.S. Cl.
CPC ....... *H04W 72/0413* (2013.01); *H04L 5/0016* (2013.01); *H04L 5/0023* (2013.01);
(Continued)

(58) Field of Classification Search
CPC .............. H04W 72/0413; H04L 27/20; H04L 27/2621; H04L 27/2624; H04L 5/0037;
(Continued)

(56) References Cited

U.S. PATENT DOCUMENTS

2016/0294509 A1\* 10/2016 Shin ...................... H04L 1/0071
2018/0077685 A1 3/2018 Wu et al.
(Continued)

OTHER PUBLICATIONS

International Search Report and Written Opinion—PCT/US2019/025880—ISA/EPO—dated Jul. 12, 2019.

*Primary Examiner* — Pao Sinkantarakorn
*Assistant Examiner* — Kabir U Jahangir
(74) *Attorney, Agent, or Firm* — Loza & Loza, LLP

(57) ABSTRACT

Aspects of the disclosure relate to methods and an apparatus for transmitting a signal in a multi-layer hybrid resource spread multiple access (RSMA) system. A non-orthogonal multiple access (NOMA) user equipment (UE) demultiplexes a stream of bits into a plurality of layers, encodes each layer with a different coding rate, modulates each layer of encoded bits with a different modulation scheme, and spreads and scrambles each layer of modulated symbols with a different spreading code and a corresponding different scrambling code. Thereafter, the NOMA UE permutes the plurality of layers having spread and scrambled symbols into a plurality of interleaved layers, scales and phase rotates each interleaved layer with a different scaling factor and a corresponding different phase rotating factor, sums the scaled and phase rotated symbols, maps the summed symbols onto a set of allocated resources, and transmits the mapped symbols via the set of resources.

30 Claims, 14 Drawing Sheets

(51) Int. Cl.
*H04L 5/00* (2006.01)
*H04L 27/26* (2006.01)
(52) U.S. Cl.
CPC .......... *H04L 5/0037* (2013.01); *H04L 5/0042* (2013.01); *H04L 5/0044* (2013.01); *H04L 5/0053* (2013.01); *H04L 27/20* (2013.01); *H04L 27/2621* (2013.01); *H04L 27/2624* (2013.01)
(58) Field of Classification Search
CPC ... H04L 5/0044; H04L 5/0023; H04L 5/0016; H04L 5/0042; H04L 5/0053
See application file for complete search history.

(56) References Cited

U.S. PATENT DOCUMENTS

2018/0083746 A1 3/2018 Kang et al.
2018/0337816 A1* 11/2018 Herath .................. H04L 1/0075

* cited by examiner

| | | TA Free | Grant Free | Large Number of UEs | Dynamic Modulation and Coding Scheme (MCS) | Use Cases/Comments |
|---|---|---|---|---|---|---|
| Asynchronous Mode | | Yes | Yes | Yes | No | Low power/overhead mMTC |
| Synchronous Mode | Grant Free Contention | No | Yes | Yes | No | Low overhead mMTC/URLLC/eMMB |
| | Semi-Persistent Scheduling | No | Yes | No | No | Support small UE number and periodic transmission of mMTC/URLLC/eMBB |
| | Grant Based | No | No | Ok | Yes | Gain over MU-MIMO unclear |

300 mMTC – massive machine-type communications
URLLC – ultra-reliable low-latency communications
eMMB – enhanced mobile broadband
MU-MIMO – multi-user multiple input multiple output

FIG. 3

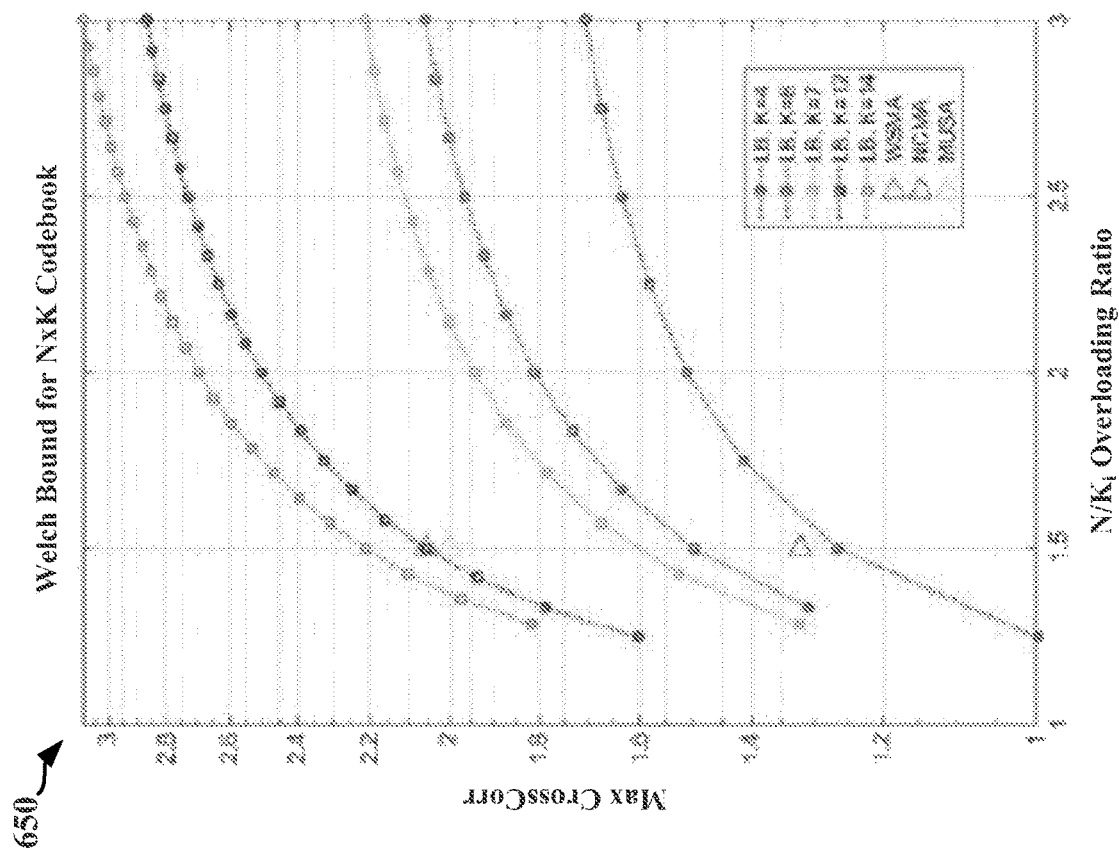
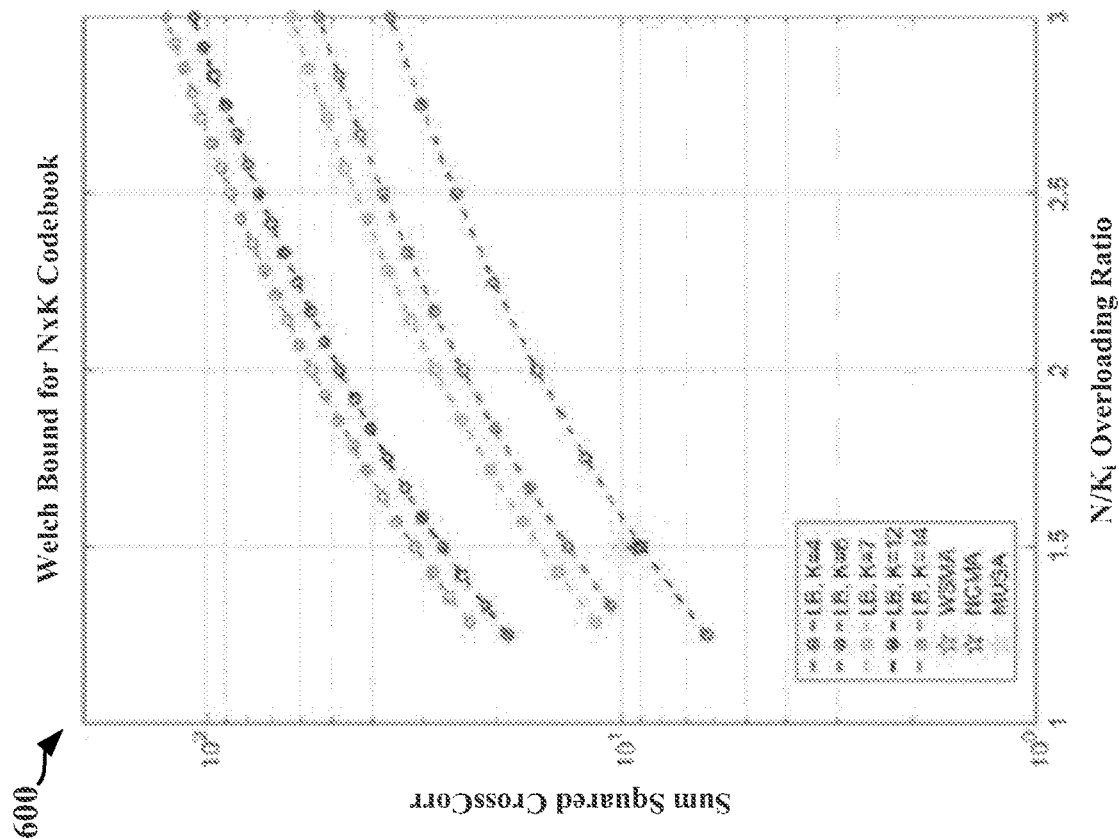
FIG. 6

| Value of K | 4 | 6 | 7 | 12 | 14 |
|---|---|---|---|---|---|
| Range of N | [5, 12] | [8, 18] | [9, 21] | [15, 36] | [18, 42] |

MULTI-LAYER RESOURCE SPREAD MULTIPLE ACCESS WITH PERMUTED POWER SCALING AND PHASE ROTATION

PRIORITY CLAIM

This application claims priority to and the benefit of U.S. Provisional Patent Application No. 62/654,053 filed on Apr. 6, 2018, the entire content of which is incorporated herein by reference as if fully set forth below in its entirety and for all applicable purposes.

TECHNICAL FIELD

The technology discussed below relates generally to wireless communication systems, and more particularly, to transmitting a signal in a multi-layer resource spread multiple access (RSMA) system. Embodiments can provide and enable techniques for demultiplexing a stream of information bits into a plurality of layers, encoding each layer with a different coding rate, modulating each layer with a different modulation scheme, and spreading and scrambling each layer with a different spreading code and a corresponding different scrambling code. Thereafter, the plurality of layers having spread and scrambled symbols are permuted into a plurality of interleaved layers prior to scaling and phase rotating each interleaved layer with a different scaling factor and a corresponding different phase rotating factor, summing the scaled and phase rotated symbols, mapping the summed symbols onto a set of allocated resources, and transmitting the mapped symbols via the set of resources.

INTRODUCTION

In wireless communications, multiple access technology allows several user devices to share one radio transmission resource. In a non-orthogonal multiple access (NOMA) system, signal transmitters and receivers are jointly modified, so that multiple layers of data from more than one user can be simultaneously delivered in the same resource. To meet the 5G requirements on the reduction of signaling overhead, decrease of latency, saving of power consumption, improvement of multiplexing efficiency, and massive connectivity, uplink NOMA is becoming an important candidate technology.

In an uplink NOMA system, at the transmitter side, the information of different UEs can be delivered using the same time, frequency, and spatial resource. At the receiver side, the information of different UEs can be recovered by advanced receivers such as a multi-user detector and a successive interference cancellation (SIC) receiver. In NOMA, the improvements in UE multiplexing efficiency and the reduction of signaling overhead can be expected by sharing the same radio resources among multiple UEs and allocating a non-orthogonal transmission resource per UE. These multiplexed UEs can be separated, for example, by assigning different spreading codes, different scrambling sequences, and/or different interleaving patterns to different UEs and creating received power difference among paired UEs.

In a hybrid resource spread multiple access (RSMA) system, a group of different UEs' signals are superpositioned on top of each other, and each UE's signal is spread to the entire frequency/time resource assigned for the group. Different UEs' signals within the group are not necessarily orthogonal to each and could potentially cause inter-UE interference. Spreading of bits to the entire resources enables decoding at a signal level below background noise and interference. Hybrid RSMA uses the combination of low rate channel codes, spreading codes and scrambling codes (and optionally different interleavers) with good correlation properties to separate different UEs' signals.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods and an apparatus for transmitting a signal in a multi-layer hybrid resource spread multiple access (RSMA) system.

In one example, a method operable at a non-orthogonal multiple access (NOMA) user equipment (UE) for transmitting a signal is disclosed. The method includes demultiplexing a stream of bits into a plurality of layers, encoding each layer of demultiplexed bits with a different coding rate, modulating each layer of encoded bits with a different modulation scheme to generate modulated symbols, spreading and scrambling each layer of modulated symbols with a different spreading code and a corresponding different scrambling code, permuting the plurality of layers having spread and scrambled symbols into a plurality of interleaved layers, scaling and phase rotating each interleaved layer of spread and scrambled symbols with a different scaling factor and a corresponding different phase rotating factor, summing the scaled and phase rotated symbols of the plurality of interleaved layers, mapping the summed symbols onto a set of resources allocated to the NOMA UE, and transmitting the superimposed and mapped symbols via the set of resources.

In another example, a non-orthogonal multiple access (NOMA) user equipment (UE) for transmitting a signal is disclosed. The NOMA UE includes means for demultiplexing a stream of bits into a plurality of layers, means for encoding each layer of demultiplexed bits with a different coding rate, means for modulating each layer of encoded bits with a different modulation scheme to generate modulated symbols, means for spreading and scrambling each layer of modulated symbols with a different spreading code and a corresponding different scrambling code, means for permuting the plurality of layers having spread and scrambled symbols into a plurality of interleaved layers, means for scaling and phase rotating each interleaved layer of spread and scrambled symbols with a different scaling factor and a corresponding different phase rotating factor, means for summing the scaled and phase rotated symbols of the plurality of interleaved layers, means for mapping the summed symbols onto a set of resources allocated to the NOMA UE, and means for transmitting the superimposed and mapped symbols via the set of resources.

In a further example, a non-orthogonal multiple access (NOMA) user equipment (UE) for transmitting a signal is disclosed. The NOMA UE includes at least one processor, a transceiver communicatively coupled to the at least one processor, and a memory communicatively coupled to the at least one processor, wherein the at least one processor is configured to demultiplex a stream of bits into a plurality of layers, encode each layer of demultiplexed bits with a different coding rate, modulate each layer of encoded bits with a different modulation scheme to generated modulated symbols, spread and scramble each layer of modulated symbols with a different spreading code and a corresponding different scrambling code, permute the plurality of layers having spread and scrambled symbols into a plurality of interleaved layers, scale and phase rotate each interleaved layer of spread and scrambled symbols with a different scaling factor and a corresponding different phase rotating factor, sum the scaled and phase rotated symbols of the plurality of interleaved layers, map the summed symbols onto a set of resources allocated to the NOMA UE, and transmit the mapped symbols via the set of resources.

In another example, a computer-readable medium storing computer-executable code for transmitting a signal at a non-orthogonal multiple access (NOMA) user equipment (UE) is disclosed. The computer-readable medium includes code for causing a computer to demultiplex a stream of bits into a plurality of layers, encode each layer of demultiplexed bits with a different coding rate, modulate each layer of encoded bits with a different modulation scheme to generate modulated symbols, spread and scramble each layer of modulated symbols with a different spreading code and a corresponding different scrambling code, permute the plurality of layers having spread and scrambled symbols into a plurality of interleaved layers, scale and phase rotate each interleaved layer of spread and scrambled symbols with a different scaling factor and a corresponding different phase rotating factor, sum the scaled and phase rotated symbols of the plurality of interleaved layers, map the summed symbols onto a set of resources allocated to the NOMA UE, and transmit the mapped symbols via the set of resources.

In a further example, a method operable at a non-orthogonal multiple access (NOMA) user equipment (UE) for transmitting a signal is disclosed. The method includes demultiplexing a stream of bits into a plurality of layers, encoding each layer of demultiplexed bits with a different coding rate, modulating each layer of encoded bits with a different modulation scheme to generate modulated symbols, permuting the plurality of layers having modulated symbols into a plurality of interleaved layers, scaling and phase rotating each interleaved layer of modulated symbols with a different scaling factor and a corresponding different phase rotating factor, summing the scaled and phase rotated symbols of the plurality of interleaved layers, spreading and scrambling the summed symbols with a spreading code and a scrambling code, mapping the spread and scrambled symbols onto a set of resources allocated to the NOMA UE, and transmitting the mapped symbols via the set of resources.

In another example, a non-orthogonal multiple access (NOMA) user equipment (UE) for transmitting a signal is disclosed. The NOMA UE includes means for demultiplexing a stream of bits into a plurality of layers, means for encoding each layer of demultiplexed bits with a different coding rate, means for modulating each layer of encoded bits with a different modulation scheme to generate modulated symbols, means for permuting the plurality of layers having modulated symbols into a plurality of interleaved layers, means for scaling and phase rotating each interleaved layer of modulated symbols with a different scaling factor and a corresponding different phase rotating factor, means for summing the scaled and phase rotated symbols of the plurality of interleaved layers, means for spreading and scrambling the summed symbols with a spreading code and a scrambling code, means for mapping the spread and scrambled symbols onto a set of resources allocated to the NOMA UE, and means for transmitting the mapped symbols via the set of resources.

In a further example, a non-orthogonal multiple access (NOMA) user equipment (UE) for transmitting a signal is disclosed. The NOMA UE includes at least one processor, a transceiver communicatively coupled to the at least one processor, and a memory communicatively coupled to the at least one processor. The at least one processor is configured to demultiplex a stream of bits into a plurality of layers, encode each layer of demultiplexed bits with a different coding rate, modulate each layer of encoded bits with a different modulation scheme to generate modulated symbols, permute the plurality of layers having modulated symbols into a plurality of interleaved layers, scale and phase rotate each interleaved layer of modulated symbols with a different scaling factor and a corresponding different phase rotating factor, sum the scaled and phase rotated symbols of the plurality of interleaved layers, spread and scramble the summed symbols with a spreading code and a scrambling code, map the spread and scrambled symbols onto a set of resources allocated to the NOMA UE, and transmit the mapped symbols via the set of resources.

In another example, a computer-readable medium storing computer-executable code for transmitting a signal at a non-orthogonal multiple access (NOMA) user equipment (UE) is disclosed. The computer-readable medium includes code for causing a computer to demultiplex a stream of bits into a plurality of layers, encode each layer of demultiplexed bits with a different coding rate, modulate each layer of encoded bits with a different modulation scheme to generate modulated symbols, permute the plurality of layers having modulated symbols into a plurality of interleaved layers, scale and phase rotate each interleaved layer of modulated symbols with a different scaling factor and a corresponding different phase rotating factor, sum the scaled and phase rotated symbols of the plurality of interleaved layers, spread and scramble the summed symbols with a spreading code and a scrambling code, map the spread and scrambled symbols onto a set of resources allocated to the NOMA UE, and transmit the mapped symbols via the set of resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 3 is a table illustrating use cases and features supported by different operation modes of a non-orthogonal multiple access (NOMA) system.

FIG. 6 shows cross-correlation behaviors of short code candidates in a resource spread multiple access (RSMA) system.

DETAILED DESCRIPTION

Figure 1:
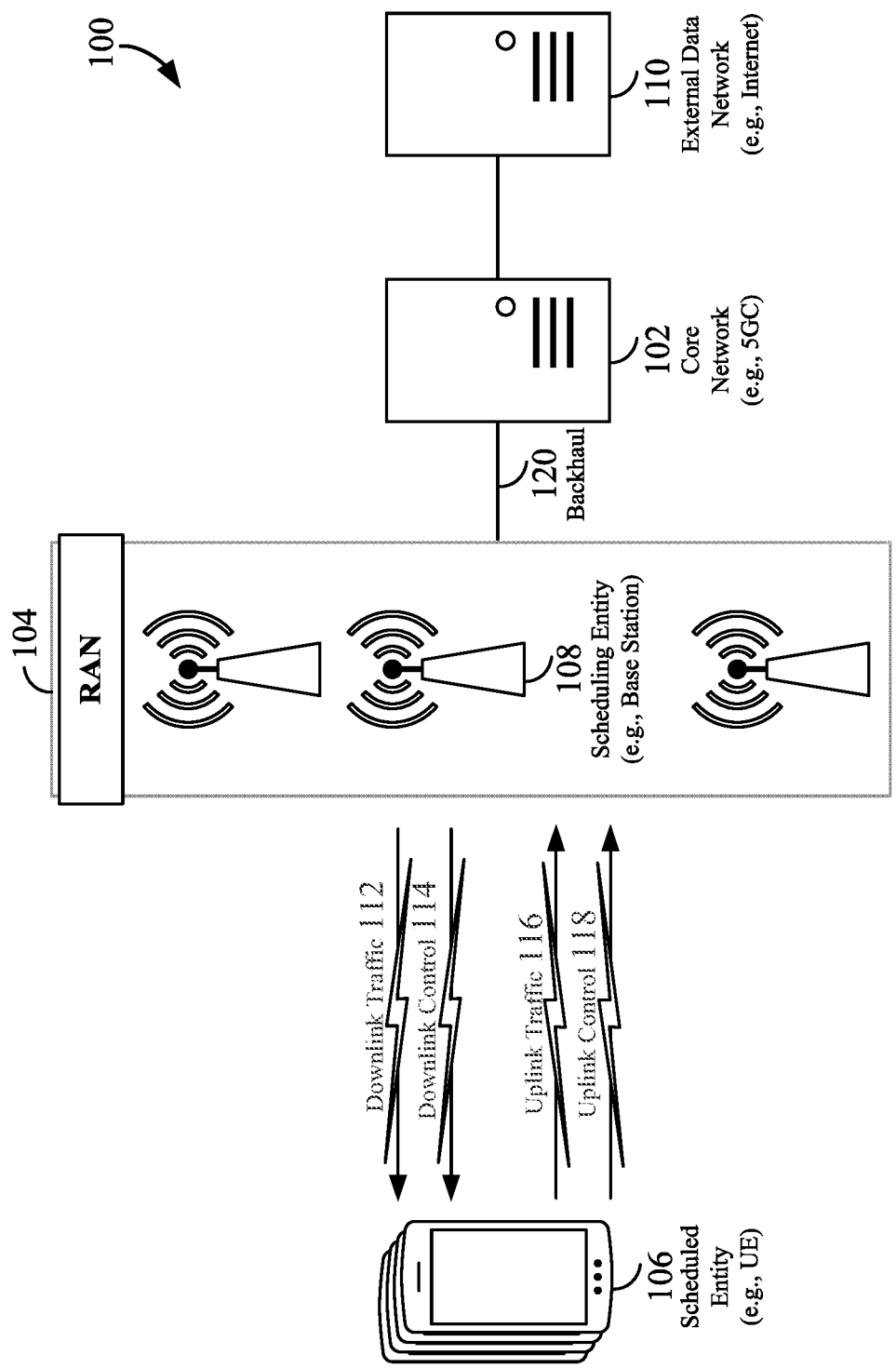
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure relate to a multi-layer resource spread multiple access (RSMA) scheme that can improve the multiplexing efficiency and reduce the signaling overhead of non-orthogonal multiple access (NOMA). To reach a spectrum efficiency, one UE may use multiple parallel layers to multiplex information (data and control information). In particular, for a given UE, different layers can carry different data streams and/or payload bits from different physical channels. Accordingly, power and phase division multiplexing can be applied to different layers of the same UE to achieve improved spectral efficiency, low PAPR/cubic metric (CM), large shaping gain, different quality of service (QoS) requirements for different layers, and/or simplification of successive interference cancellation (SIC) receiver implementation.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as UE in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
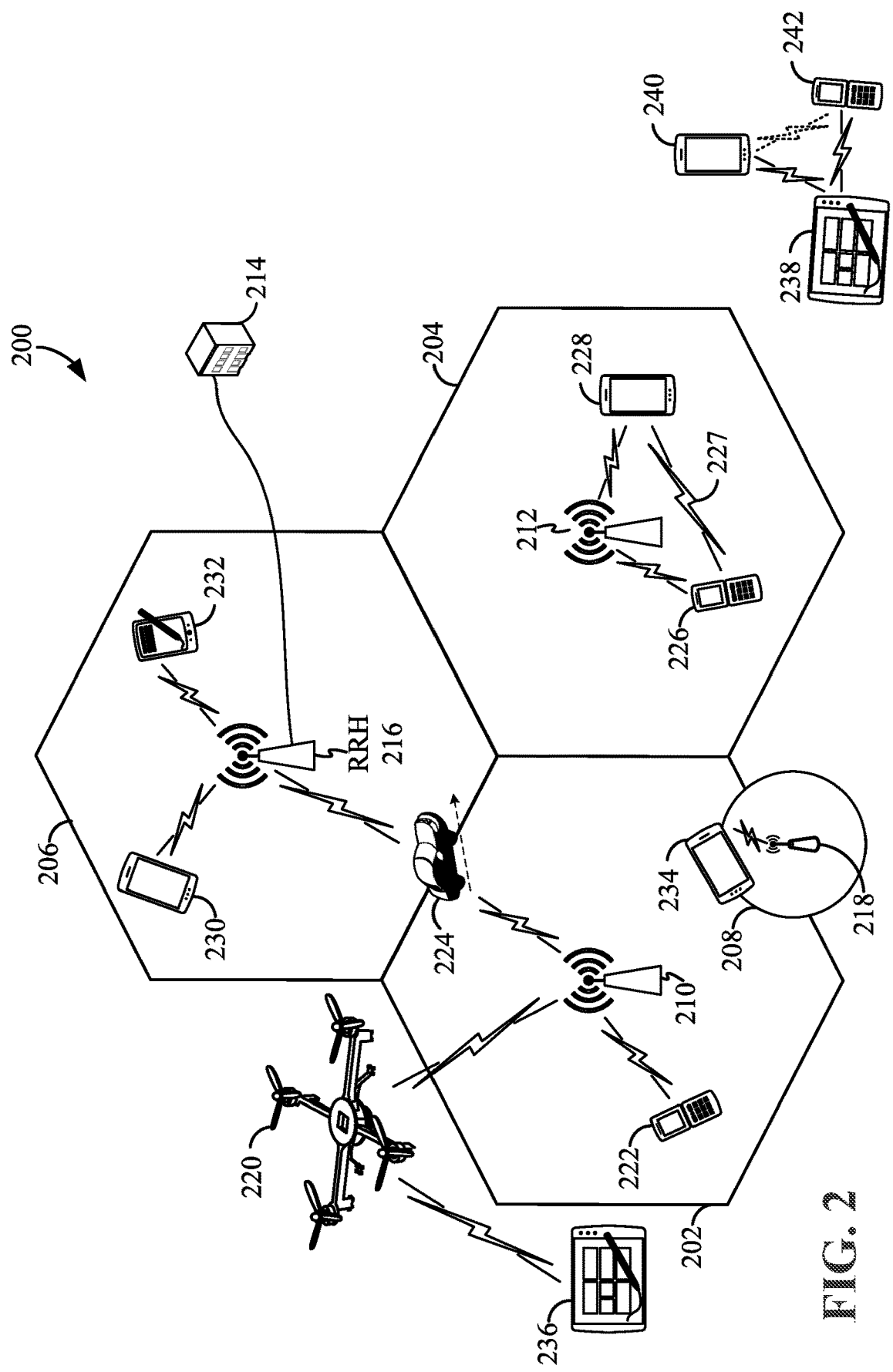
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a UE based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages exchanged between the UE and the network may be reduced.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), non-orthogonal multiple access (NOMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Aspects of the present disclosure relate to non-orthogonal multiple access (NOMA) schemes. In particular, aspects relate to an uplink (UL) NOMA scheme for both grant-based and grant-free transmissions. To combat the interference between non-orthogonal transmissions, transmitter side schemes such as spreading and interleaving are employed to improve the performance and reduce the complexity of advanced receivers.

In an aspect, a general framework for NOMA UL signal processing and transmission is provided with respect to linear hybrid spreading schemes. Linear hybrid spreading can be applied to both a CP-OFDM and a DFT-s-OFDM waveform, which facilitates scalable operation and transceiver complexity reduction. NOMA UL transmission may consider the best trade-off among the design objectives of block error rate (BLER) performance, scalability, flexibility, peak-to-average power ratio (PAPR), and complexity.

FIG. 3 is a table 300 illustrating use cases and features supported by different operation modes of NOMA. In NOMA UL transmission, multiple UEs share the same time/frequency resources via non-orthogonal resource allocation. As shown in table 300, the NOMA operation may have different modes such as an asynchronous mode and a synchronous mode. The synchronous mode may be classified into three categories: 1) grant free contention; 2) semi-persistent scheduling; and 3) grant based.

Figure 4:
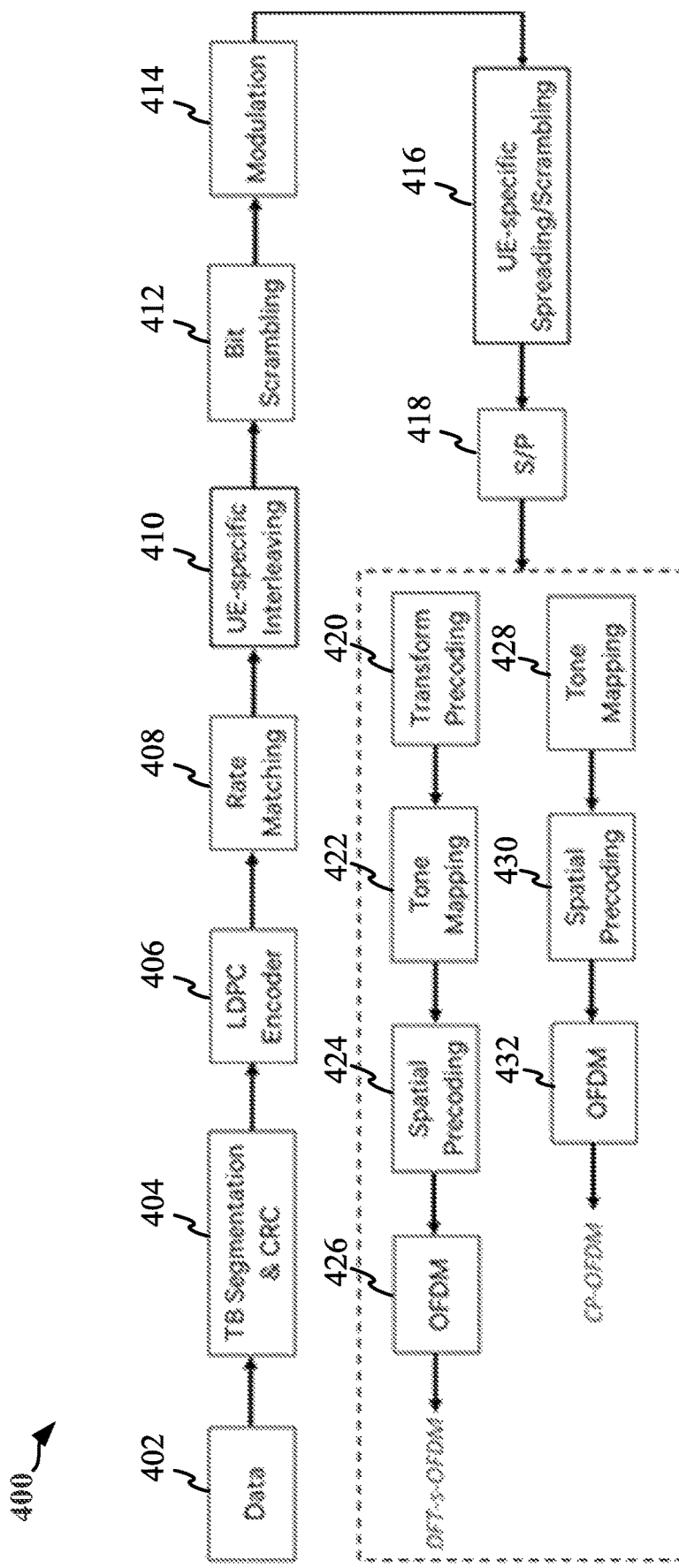
FIG. 4 is a general framework for NOMA uplink (UL) transmission.

FIG. 4 is a general framework 400 for NOMA UL transmission. In terms of UL data transmission, FIG. 4 shows a unified framework for NOMA based on UE-specific interleaving, spreading, and scrambling. For a data transmission based on UE-specific spreading, existing solutions can be classified into two categories: 1) linear spreading; and 2) nonlinear spreading. The category of linear spreading includes solutions such as resource spread multiple access (RSMA), multi-user shared access (MUSA), Welch-bound spreading multiple access (WSMA), non-orthogonal coded multiple access (NCMA), and group orthogonal coded access (GOCA), while the category of nonlinear spreading includes sparse code multiple access (SCMA). Linear spreading can be applied to both a DFT-s-OFDM waveform and a CP-OFDM waveform.

As shown in FIG. 4, when performing a NOMA UL transmission, data 402 is subjected to transport block (TB) segmentation and a cyclic redundancy check (CRC) 404. The data is then encoded with a low-density parity check (LPDC) 406. Thereafter, the data undergoes rate matching 408 and UE-specific interleaving 410 prior to bit scrambling 412 and modulation 414 to generate modulated symbols. The modulated symbols are then subjected to UE-specific spreading and scrambling 416 and a serial-to-parallel (S/P) module 418. Notably, if a DFT-s-OFDM waveform is to be transmitted, the spread and scrambled symbols undergo transform precoding 420, tone mapping 422, spatial precoding 424, and orthogonal frequency division multiplexing 426 to generate the DFT-s-OFDM waveform for transmission. Alternatively, if a CP-OFDM waveform is to be transmitted, the spread and scrambled symbols undergo tone mapping 428, spatial precoding 430, and orthogonal frequency division multiplexing 432 to generate the CP-OFDM waveform to be transmitted.

NOMA may depend on advanced receivers with inter-UE interference cancellation capabilities. As such, in an aspect, NOMA UL transmission may consider the best trade-off among the following design objectives: 1) Performance—BLER vs. signal-to-noise ratio (SNR) vs. per UE spectral efficiency; 2) Scalability—easy adaptation of spreading codes configuration to accommodate N NOMA UEs with spreading factor K, where N and K are integers that can be configured dynamically; 3) Complexity—transmitter side and receiver side processing, including computation and memory requirements for successful data decoding; 4) Flexibility—joint support of DFT-s-OFDM waveform and CP-OFDM waveform; and 5) PAPR and adjacent channel leakage ratio (ACLR).

Figure 5:
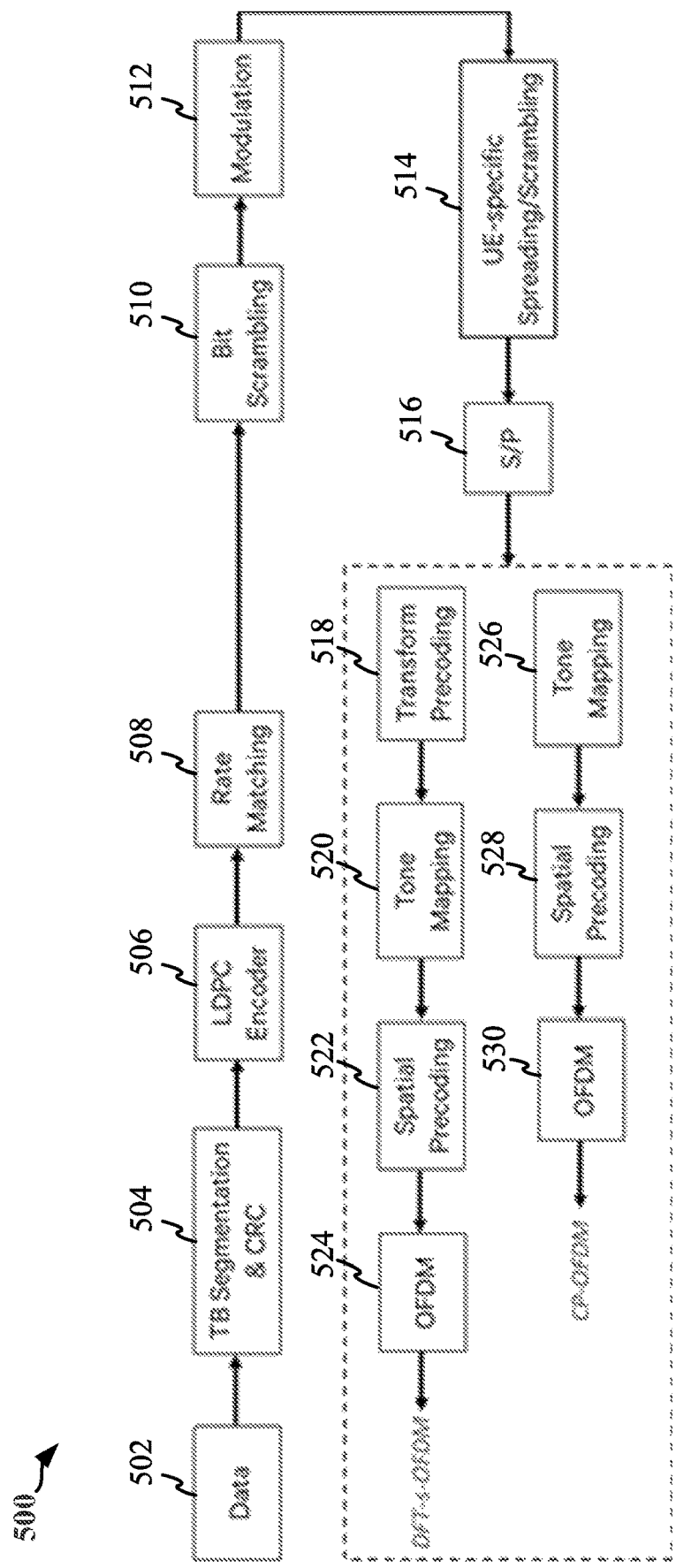
FIG. 5 is a linear hybrid spreading framework for NOMA UL transmission.

FIG. 5 is a linear hybrid spreading framework 500 for NOMA UL transmission. In FIG. 5, NOMA UL transmission blocks based on linear hybrid spreading are shown. Specifically, the assignment of linear spreading codes is UE specific, which carries the multiple access signature. The assignment of a scrambling sequence can be UE or cell specific. A same or different set of spreading codes and scrambling sequences can be employed for the CP-OFDM and the DFT-s-OFDM waveform. To randomize the inter-UE interference and maximize the reuse of NOMA resources, the mapping of spreading code and scrambling sequence can be made symbol dependent.

As shown in FIG. 5, when performing a NOMA UL transmission based on linear hybrid spreading, data 502 may be subjected to transport block (TB) segmentation and a cyclic redundancy check (CRC) 504. The data may then be encoded with a low-density parity check (LPDC) 506. Thereafter, the data may undergo rate matching 508 and bit scrambling 512 before modulation 514 to generate modulated symbols. The modulated symbols may then be subjected to UE-specific spreading and scrambling 516 and a serial-to-parallel (S/P) module 518. Notably, if a DFT-s-OFDM waveform is to be transmitted, the spread and scrambled symbols may undergo transform precoding 518, tone mapping 520, spatial precoding 522, and orthogonal frequency division multiplexing 524 to generate the DFT-s-OFDM waveform for transmission. Alternatively, if a CP-OFDM waveform is to be transmitted, the spread and scrambled symbols may undergo tone mapping 526, spatial precoding 528, and orthogonal frequency division multiplexing 530 to generate the CP-OFDM waveform for transmission.

Compared with a nonlinear spreading scheme, solutions based on linear hybrid spreading may exhibit similar BLER and significantly better performance in scalability, complexity, PAPR, and flexibility. As such, in an aspect, a NOMA UE may implement linear hybrid spreading as the scheme for performing UL transmissions.

Within the category of linear hybrid spreading, the design of spreading codes/scrambling sequences can be different in one or multiple aspects. For example, a length of a spreading code may be relatively short or long, a codebook construction may be fixed or scalable, and UE-specific spreading may or may not be combined with symbol scrambling.

In an aspect, the use of long spreading codes may result in a large codebook with good auto-correlation and low cross-correlation properties. As such, long spreading codes are robust against transceiver synchronization errors and timing uncertainties associated with asynchronous transmission. A large processing gain associated with long spreading codes is also beneficial for inter-UE interference suppression. Therefore, it is advantageous to utilize long spreading codes for grant-free, asynchronous (free of timing advance) NOMA transmissions. To improve spectral efficiency, a multi-layer transmission can be used, either stand alone or in combination with spatial multiplexing schemes (in the presence of multiple TX antennas).

In another aspect, compared to long spreading codes, short spreading codes entail a smaller spreading factor and higher spectral efficiency. The short spreading codes can be used to achieve a Welch bound on cross-correlations, which can be leveraged for multi-user detection (MUD) and inter-UE interference cancellation for synchronized reception. Also, the short spreading codes can be easily combined with spatial precoding to further mitigate the cross-correlation and enhance the NOMA capacity.

Figure 7:
FIG. 7 is a table of configurations for NOMA codebook design for linear spreading.

The design of short spreading codes may be based on one or more criteria. For example, a criterion may be a minimum sum squared cross-correlation or a maximum pairwise cross-correlation of an entire codebook. To illustrate, FIG. 6 shows cross-correlation behaviors 600 and 650 of short code candidates against a corresponding Welch bound on sum squared and pairwise cross-correlation, respectively. With regard to three example candidate schemes (e.g., WSMA, NCMA, and MUSA), only the N×K codebook of size 6×4 is available (N=6, K=4, where N denotes the codebook size and K denotes the spreading factor), which corresponds to an overloading ratio of 1.5. For a comprehensive evaluation of codebook design for linear spreading codes, a wider range of N and K values may be implemented. For example, the configurations in table 700 of FIG. 7 may be implemented, wherein a first row of the table 700 provides values for K and a second row of the table 700 provides a range for N. As such, the design and evaluation of a linear spreading codebook may consider a comprehensive set of overloading configurations for (K, N), where K denotes the spreading factor and N denotes the codebook size.

In an aspect, the use of a long scrambling sequence is helpful in PAPR reduction. Moreover, the use of different scrambling sequences across adjacent cells may reduce inter-cell interference. Both features are desirable for link budget and system capacity enhancement.

Depending on the use cases for NOMA UL, the following options may be implemented: 1) use of short spreading code only; 2) use of long spreading code only; 3) and joint use of short/long spreading code and long scrambling sequence.

Depending on the use cases of NOMA UL transmission, the following options for linear hybrid spreading may be implemented. In a first option, only a UE-specific short spreading code is applied, wherein the configuration of spreading code may be made symbol-dependent. In a second option, only a UE-specific long spreading code is applied, wherein the configuration of spreading code may be made symbol-dependent. In a third option, a UE-specific short spreading code and a cell-specific long scrambling sequence is jointly used, wherein the configuration of spreading code and/or scrambling sequence may be made symbol-dependent.

In an aspect, peak-to-average power ratio (PAPR) performance is considered during transmitter side implementation. For instance, a lower PAPR can lead to more power efficient transmissions at reduced processing complexity. As will be described, the PAPR performance of linear spreading with and without symbol-wise scrambling is compared for WSMA, NCMA, and MUSA schemes. Data modulation used in the examples shown in FIGS. 8 and 9 is quadrature phase-shift keying (QPSK).

Figure 8:
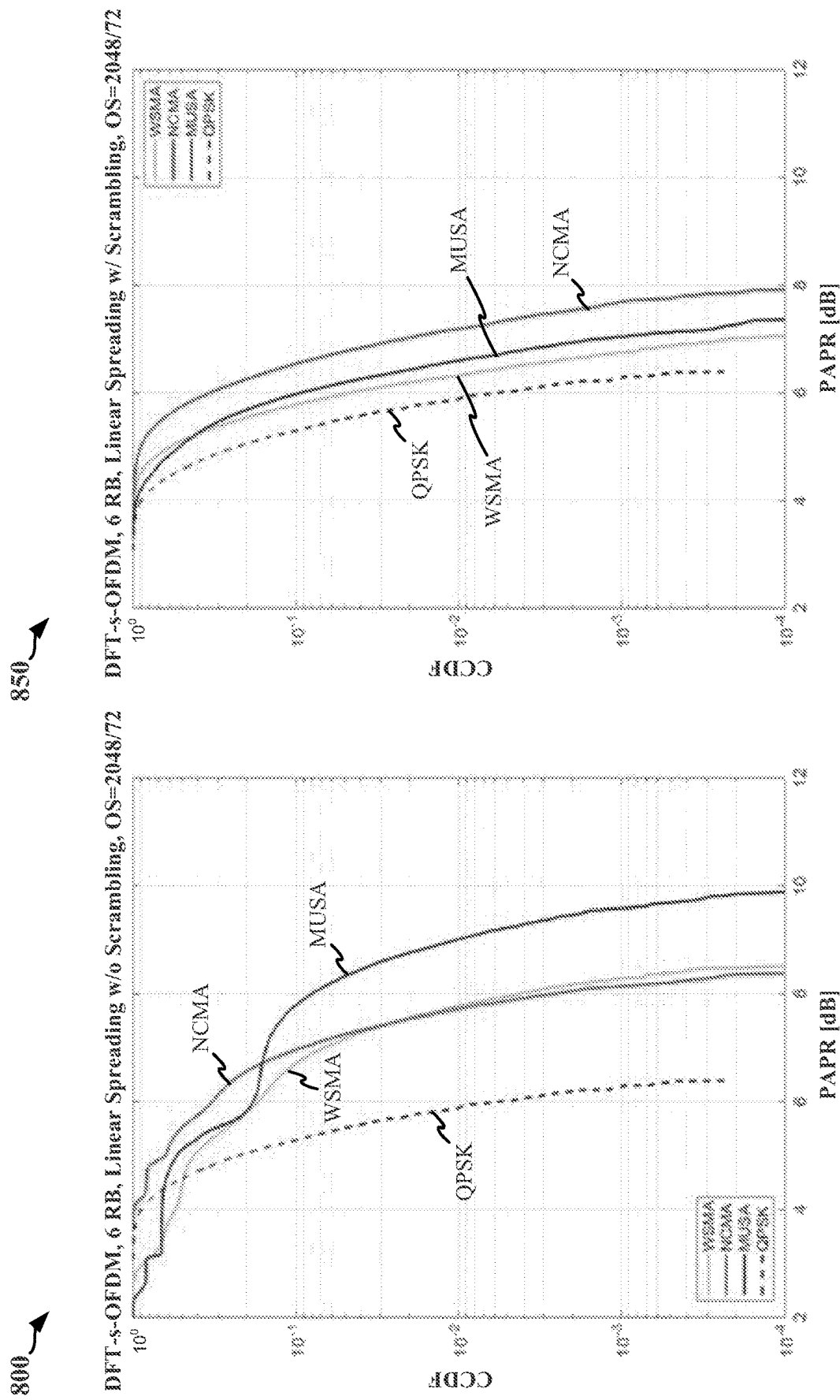
FIG. 8 illustrates diagrams of peak-to-average power ratio (PAPRs) of a DFT-s-OFDM waveform for linear hybrid spreading.

FIG. 8 illustrates diagrams 800 and 850 of peak-to-average power ratios (PAPRs) of a DFT-s-OFDM waveform for linear hybrid spreading. In particular, the diagram 800 describes the PAPR performance of linear hybrid spreading for the DFT-s-OFDM waveform without symbol-wise scrambling for WSMA, NCMA, and MUSA schemes. The diagram 850 describes the PAPR performance of linear hybrid spreading for the DFT-s-OFDM waveform with symbol-wise scrambling for WSMA, NCMA, and MUSA schemes. FIG. 9 illustrates diagrams 900 950 of peak-toaverage power ratios (PAPRs) of a CP-OFDM waveform for linear hybrid spreading. In particular, the diagram 900 describes the PAPR performance of linear hybrid spreading for the CP-OFDM waveform without symbol-wise scrambling for WSMA, NCMA, and MUSA schemes. The diagram 950 describes the PAPR performance of linear hybrid spreading for the CP-OFDM waveform with symbol-wise scrambling for WSMA, NCMA, and MUSA schemes.

Figure 9:
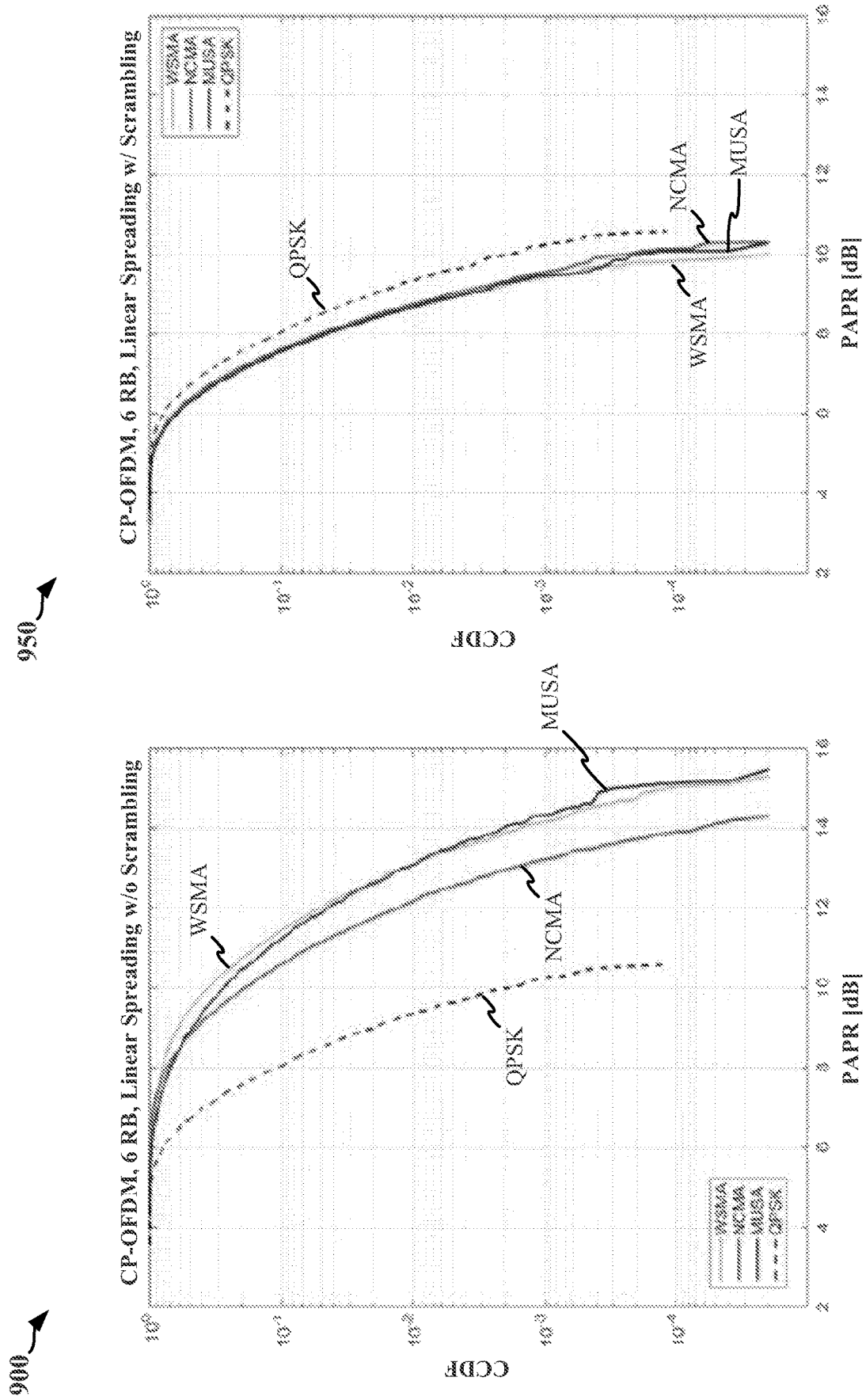
FIG. 9 illustrates PAPRs of a CP-OFDM waveform for linear hybrid spreading.

As shown in FIGS. 8 and 9, for both the DFT-s-OFDM and the CP-OFDM waveforms, symbol-wise scrambling can significantly reduce the PAPR of linear spreading schemes such as WSMA, NCMA and MUSA. Accordingly, the design of a linear spreading scheme for NOMA may implement symbol scrambling to improve PAPR performance. The PAPR distribution of QPSK can be used as a baseline.

NOMA is a multi-user uplink transmission scheme that is different from traditional multiple access schemes, such as OFDMA, CDMA, TDMA, etc. In NOMA, multiple users share the same set of time-frequency resources in a non-orthogonal manner. Moreover, the traditional multiple access methods may not be able to achieve an upper bound of a capacity region of a multiple access channel. However, in NOMA, a transmission side and an advanced receiver scheme at a receiver side may operate together to improve the capacity region of the multiple access channel.

Aspects of the present disclosure provide a unified non-orthogonal multiple access solution for all use cases. The solution may be generalized as a multi-layer resource spread multiple access (RSMA) scheme that can improve the multiplexing efficiency of NOMA. Multi-layer refers to different UEs possibly having different spectrum efficiencies. To reach a spectrum efficiency, one UE may use multiple parallel layers to multiplex its data (or data and control information). In particular, for a given UE, different layers can carry different data streams and/or payload bits from different physical channels. Power and phase division multiplexing can be applied to different layers of the same UE to achieve improved spectral efficiency, low PAPR/cubic metric (CM), large shaping gain, different quality of service (QoS) requirements for different layers, and/or simplification of successive interference cancellation (SIC) receiver implementation.

In an aspect of the disclosure, the classification of receiver types may be generalized into a combination of MUD and interference cancellation (IC). In particular, the MUD implementation may be classified into three categories, namely, linear minimum mean square error (LMMSE), expected square error (ESE), and message passing algorithm (MPA). The IC implementation can be classified into two categories, Hard IC and Soft IC. Moreover, receivers may be based on LMMSE successive interference cancellation (LMMSE-SIC) and ESE successive interference cancellation (ESE-SIC), and their complexity per outer iteration may be shown in Table 1 below, wherein K is the spreading factor, J is the number of users, M is the modulation alphabet size, and $\tilde{J}$ is the number of users transmitting on the same resource.

TABLE 1

| NOMA MUD Receiver | Computational Complexity (per Outer Iteration) |
| --- | --- |
| LMMSE-SIC | $O(K^3 + K^2J + KJ^2)$ |
| ESE-SIC | $O(KJ^2)$ |

In RSMA, depending on the waveform (e.g., DFT-s-OFDM, CP-OFDM, etc.), a UE may use a spreading code and a scrambling code to transform its data (or data and control information) and map the spread/scrambled data to a time-frequency resource. For example, a first UE may use multiple layers to multiplex its different data streams or different physical channels. Thereafter, the first UE may apply a UE-specific scrambling code and spreading code to map the first UE's information to time-frequency resources shared with other UEs. As such, a second UE may use the same set of time-frequency resources as the first UE. However, to distinguish the second UE's information from the first UE's information, the second UE will apply a different scrambling code and a different spreading code to the second UE's information.

Aspects of the present disclosure provide a solution that applies to both grant-based and grant-free transmissions. Specifically, a multiple access (MA) signature of a UE can be assigned by a gNode B (gNB), or randomly selected from a pre-configured set of MA signatures. The solution supports both a CP-OFDM and a DFT-s-OFDM waveform. The solution also supports both synchronous (synchronous within cyclic prefix (CP)) and asynchronous (timing offset exceeds CP) situations. The solution also supports open-loop power control, as well as closed-loop power control.

When the receiver does not know which MA signature is used by a transmitting UE, the receiver may detect the UE identity by a front-loaded preamble or reference signal, such as demodulated reference signal (DMRS). For synchronized cases (synchronous within CP), the processing of DFT-s-OFDM is similar to that of CF-OFDM, except for additional transform coding. When the timing offset exceeds CP, sliding-window-based time domain processing such as Rake/ESE SIC, can be performed sequentially by the receiver.

Figure 10:
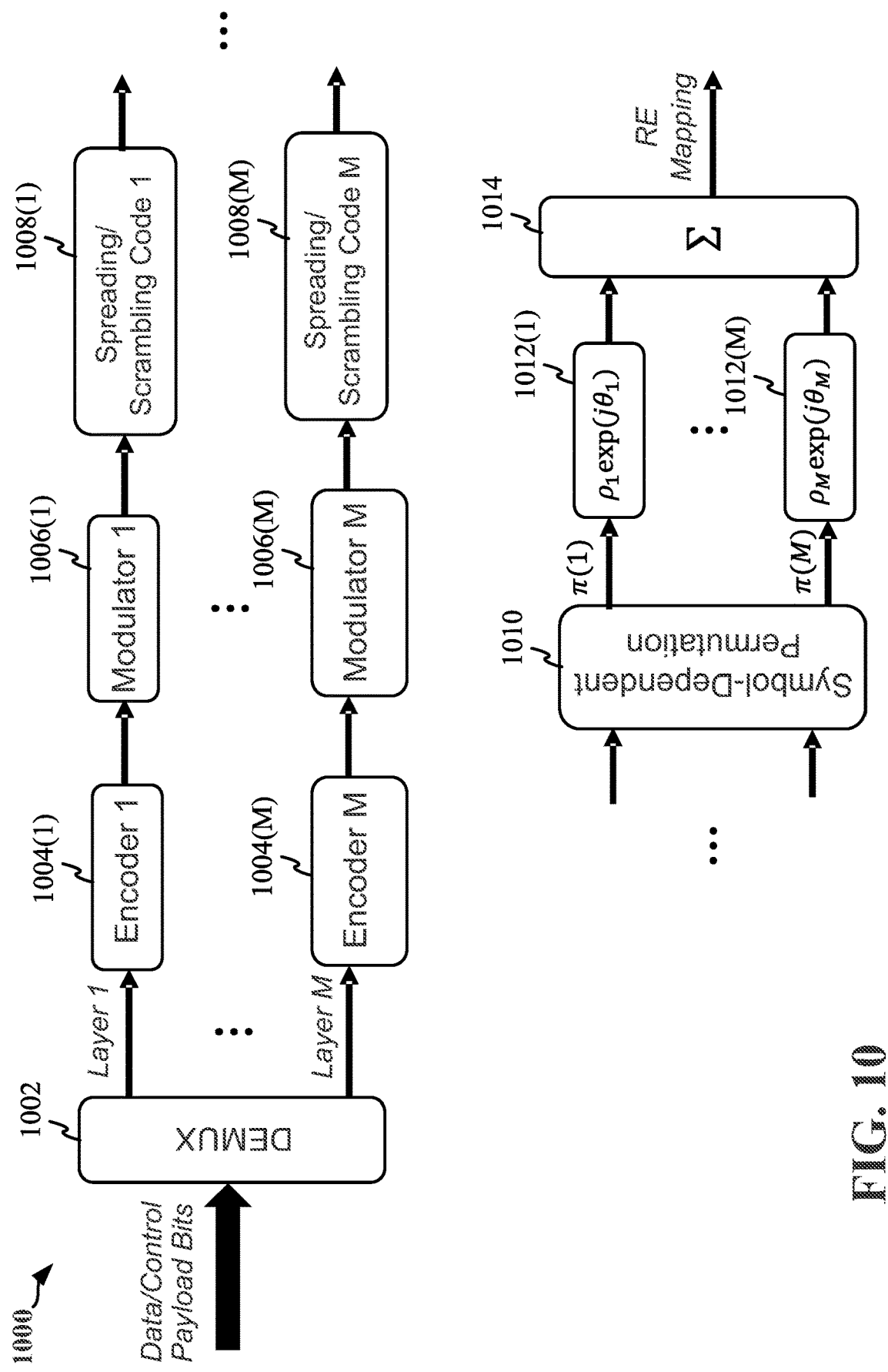
FIG. 10 illustrates an example of a multi-layer RSMA framework utilizing power scaling and phase rotation according to aspects of the disclosure.

FIG. 10 illustrates an example of a multi-layer resource spread multiple access (RSMA) framework 1000 utilizing power scaling and phase rotation according to aspects of the disclosure. As shown, the example multi-layer RSMA framework 1000 may include a demultiplexer 1002, a plurality of encoders 1004(1) to 1004(M), where M is an integer greater than 1 representing a number of layers, a plurality of modulators 1006(1) to 1006(M), a plurality of spreading/scrambling code blocks 1008(1) to 1008(M), a symbol-dependent permutation block 1010, a plurality of scaling/phase rotating blocks 1012(1) to 1012(M), and a summation block 1014. Moreover, framework 1000 shown in FIG. 10 applies to a single UE.

In an aspect, payload bits (information bits) from a physical data channel (e.g., physical uplink shared channel (PUSCH)), payload bits from a physical control channel (e.g., physical uplink control channel (PUCCH)), or a combination of payload bits from the physical data channel and the physical control channel may be input to the demultiplexer 1002. The input of the demultiplexer 1002 may be from multiple physical channels. The demultiplexer 1002 outputs demultiplexed or layered information bits (e.g., Layers 1 to M) of the input. As such, the multi-layer RSMA framework 1000 generates multiple layers by splitting a single stream of data/control bits into multiple parallel streams Each stream may be mapped to a particular layer (one of Layers 1 to M) and the layering may occur internally prior to modulation.

In a further aspect, information bits sent through a particular layer (one of Layers 1 to M) are processed through a corresponding encoder (one of encoders 1004(1) to 1004(M)), a corresponding modulator (one of modulators 1006(1) to 1006(M)), and a corresponding spreading/scrambling code block (one of spreading/scrambling code blocks 1008(1) to 1008(M)).

The generation of a spreading code may be UE specific. Both a pseudo-random sequence and Welch Bound Equality (WBE) sets may be employed for spreading. For example, assume the spreading factor is K and the codebook for linear spreading codes have N entries (N≥K≥2). Specifically, the n-th spreading code may be given by:

$$S_n \triangleq [s_n(1) s_n(2) \ldots s_n(K)]; 1 \leq n \leq N, N \geq K \geq 2.$$

For example, the generation of $S_n$ can down select from the following formulas:

Option A $$s_n^A(k) \triangleq \frac{1}{\sqrt{K}} \exp\left(j\pi\left(\frac{(k+n+\theta)^2}{N}\right)\right);$$

$1 \leq k \leq K, 1 \leq n \leq N, -N \leq \theta < N;$

Option B $$s_n^B(k) \triangleq \frac{1}{\sqrt{K}} \exp\left(j\pi\left(\frac{(k+n+\theta)(k+n+\theta+1)}{N}\right)\right);$$

$1 \leq k \leq K, 1 \leq n \leq N, -N \leq \theta < N;$ and

Option C $$s_n^C(k) \triangleq s_n^x(k) w(k); x \in \{A, B\}, 1 \leq k \leq K, 1 \leq n \leq N,$$

$-N \leq \theta < N$ where $\{w(k)\}$ is a periodic and perfect sequence satisfying $$\sum_{k=1}^{K} w(k) w^*(k+l) = \delta(l).$$

The spreading codes generated by any option above is a WBE set, which achieves the Welch bound on sum squared correlations for arbitrary selection of K and N. The generation of a scrambling code can be UE and cell specific. The sequences used for scrambling code can down select from Gold sequences and Zadoff-Chu sequences.

Outputs of the spreading/scrambling code blocks 1008(1) to 1008(M) are input to a symbol-dependent permutation block 1010 to interleave the information of the layers. The symbol-dependent permutation block 1010 outputs interleaved information π(1) to π(M). Notably, although the indexes 1 to M were originally assigned to identify the different layers, after passing through the symbol-dependent permutation block 1010, the order of the information of the layers may be permuted. For example, the information of Layer 1 may be permuted to another layer.

Each interleaved information π(1) to π(M) is input to a corresponding scaling/phase rotating block (one of scaling/phase rotating blocks 1012(1) to 1012(M)). Scaling is applied via a scaling factor ρ and phase rotation is applied via a phase rotating factor θ. For different layers 1 to M, a different scaling factor ρ and a different phase rotating factor θ is assigned. After scaling and phase rotating, the information of the different layers are summed using the summation block 1014 to superimpose the different layers. Finally, the information is mapped to a set of resource elements shared by other UEs in a non-orthogonal manner. In an aspect, the resource element mapping may include additional transform coding prior to generating the DFT OFDM waveform, or the resource element mapping may directly generate the OFDM waveform.

In an aspect, when different encoders are provided for different layers, different code rates may be applied to the different layers. Different modulations may also be applied to distinguish the different layers. In an example, one layer of information may be from a control channel while another layer of information may be from a data channel. The different layers may further be separated by applying a different spreading code and a different scrambling code to the different layers. Even if all the layers are from one physical channel (e.g., physical data channel), each layer may have a different quality of service (QoS) requirement (e.g., some data may be hybrid automatic repeat request (HARQ) data and other data may be first transmission data) from an upper layer perspective. Thus, by using a different spreading code and a different scrambling code, the different QoS requirements may be distinguished.

In a further aspect, the permutation performed at the symbol-dependent permutation block 1010 may be time-variant. At the output of the symbol-dependent permutation block 1010, a different scaling factor ρ is applied to the different layers. This means that the layers are being weighted with different scaling factors. For a given layer, if a smaller scaling factor ρ (smaller weighting) is constantly being applied, the given layer may experience artificial fading more than the other layers. As such, in order to be fair to all of the layers, the layer positions are permuted in time (or shifted) so that each layer is applied a different scaling factor in time. For example, for a first transmission (a first transmission time interval (TTI)), a largest scaling factor may applied to a first layer and a smallest scaling factor may be applied to a last layer. For a second transmission (a next TTI), each layer may be permuted (shifted) so that a different scaling factor is applied to each layer.

In an aspect, different scaling factors ρ are applied to the different layers at the output of the symbol-dependent permutation block 1010 in order to simplify a successive interference cancellation (SIC) receiver. Based on the different scaling factors ρ, a receiver side may be able to identify which layers have high quality and decide which layers may be decoded and canceled first. Such is the essence of successive interference cancellation (SIC). This may apply to different UEs and to different layers of the same UE. Using different scaling factors ρ to create a hierarchy for a transmitted signal is beneficial to simplifying a receiver structure (e.g., SIC receiver structure). But to balance the application of the different scaling factors ρ, symbol-dependent permutation is to be applied (as described above) so that each layer may experience the same scaling.

In an aspect, after summation is performed by the summation block 1014, resource element (RE) mapping is performed to generate serial map data. RE mapping may include performing a serial-to-parallel conversion of the information. Thereafter, the information may be mapped to all subcarriers allocated to one UE. Another UE may occupy the same set of subcarriers. Such is the essence of NOMA. For RE mapping, one UE will map to a set of resources and another UE will map to the same set of resources. Unlike OFDM, UEs in a NOMA scheme will not map to different resources.

Figure 11:
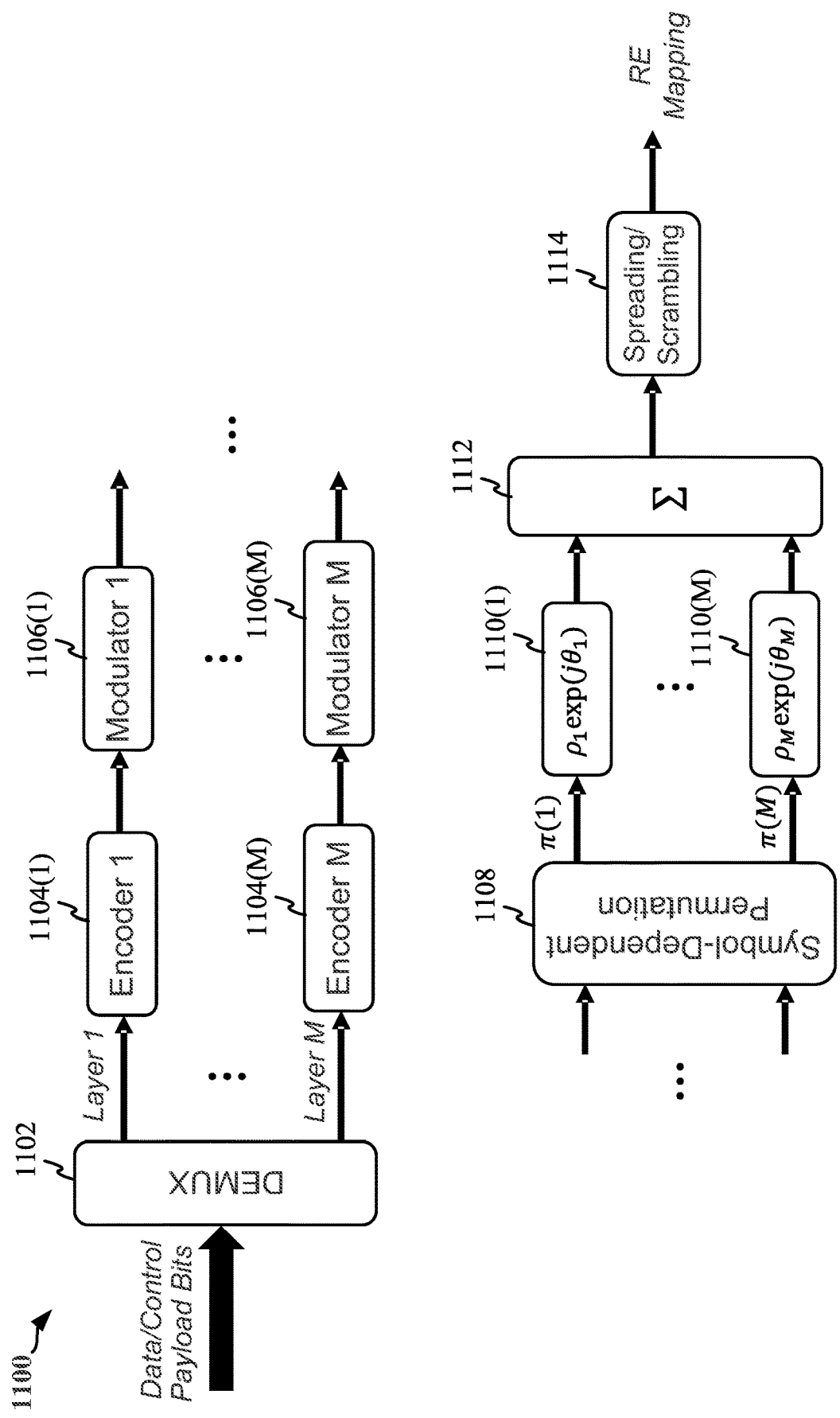
FIG. 11 illustrates another example of a multi-layer RSMA framework utilizing power scaling and phase rotation according to aspects of the disclosure.

FIG. 11 illustrates another example of a multi-layer resource spread multiple access (RSMA) framework 1100 utilizing power scaling and phase rotation according to aspects of the disclosure. As shown, the example multi-layer RSMA framework 1100 may include a demultiplexer 1102, a plurality of encoders 1104(1) to 1104(M), where M is an integer greater than 1 representing a number of layers, a plurality of modulators 1106(1) to 1106(M), a symbol-dependent permutation block 1108, a plurality of scaling/phase rotating blocks 1110(1) to 1110(M), a summation block 1112, and a spreading/scrambling code block 1114. Framework 1100 shown in FIG. 11 applies to a single UE.

In an aspect, operations performed in the framework 1100 are similar to the operations described above with respect to the framework 1000 of FIG. 10 with a few differences. For example, the symbol-dependent permutation block 1108 interleaves the information of the layers based on the outputs of the modulators 1106(1) to 1106(M). Thereafter, each interleaved information π(1) to π(M) is input to a corresponding scaling/phase rotating block (one of scaling/phase rotating blocks 1110(1) to 1110(M)), wherein scaling is applied to the different permuted layers via different scaling factor ρ and phase rotation is applied to the different permuted layers via different phase rotating factors θ. After scaling and phase rotating, the information of the different layers are summed using the summation block 1112 to superimpose the different layers. Finally, a spreading code and a scrambling code is applied to the summed information (superimposed constellation) via the spreading/scrambling code block 1114 before being mapped to a set of resource elements shared by other UEs in a non-orthogonal manner.

In an aspect, the operations of the framework 1100 may be implemented in a system that cannot generate enough low-correlated spreading/scrambling codes for a large number of UEs. Accordingly, based on the framework 1100, the spreading/scrambling codes may be made specific to a UE. Unlike the framework 1000 of FIG. 10, where the spreading/scrambling codes may be made layer-specific and UE-specific, the spreading/scrambling codes of the framework 1100 in FIG. 11 are UE-specific only.

A decision as to which framework to use (e.g., framework 1000 of FIG. 10 or framework 1100 of FIG. 11) may depend on an overloading ratio of the system. If the system targets a small number of UEs but each UE has a high spectral efficiency, then spreading/scrambling codes may be made specific to different layers as well as the UE. But for other cases in NOMA, if the spectral efficiency is a low priority, then the spreading/scrambling codes may be made UE-specific only.

In an aspect, PAPR and cubic metric (CM) performance of multi-layer RSMA depends on the configuration of the scaling/phase rotating factor $\{\rho_k \exp(\theta_k), k=1, 2, \ldots, M\}$. As such, the scaling factor ρ and the phase rotating factor θ should be chosen carefully to control the PAPR and cubic metric (CM). Iterative decoding performance may also depend on the scaling/phase rotating factor $\{\rho_k \exp(\theta_k), k=1, 2, \ldots, M\}$. The optimization of $\{\rho_k \exp(\theta_k), k=1, 2, \ldots, M\}$ may be a tradeoff between a desired shaping gain and PAPR/CM. For layers with similar QoS constraints, symbols from the output of a spreading/scrambling block can be permuted to obtain equalized performance. For layers with different QoS requirements, unequal error protection can be implemented by allocating larger power scaling factors to more important layers, which may make decoding more reliable.

Figure 12:
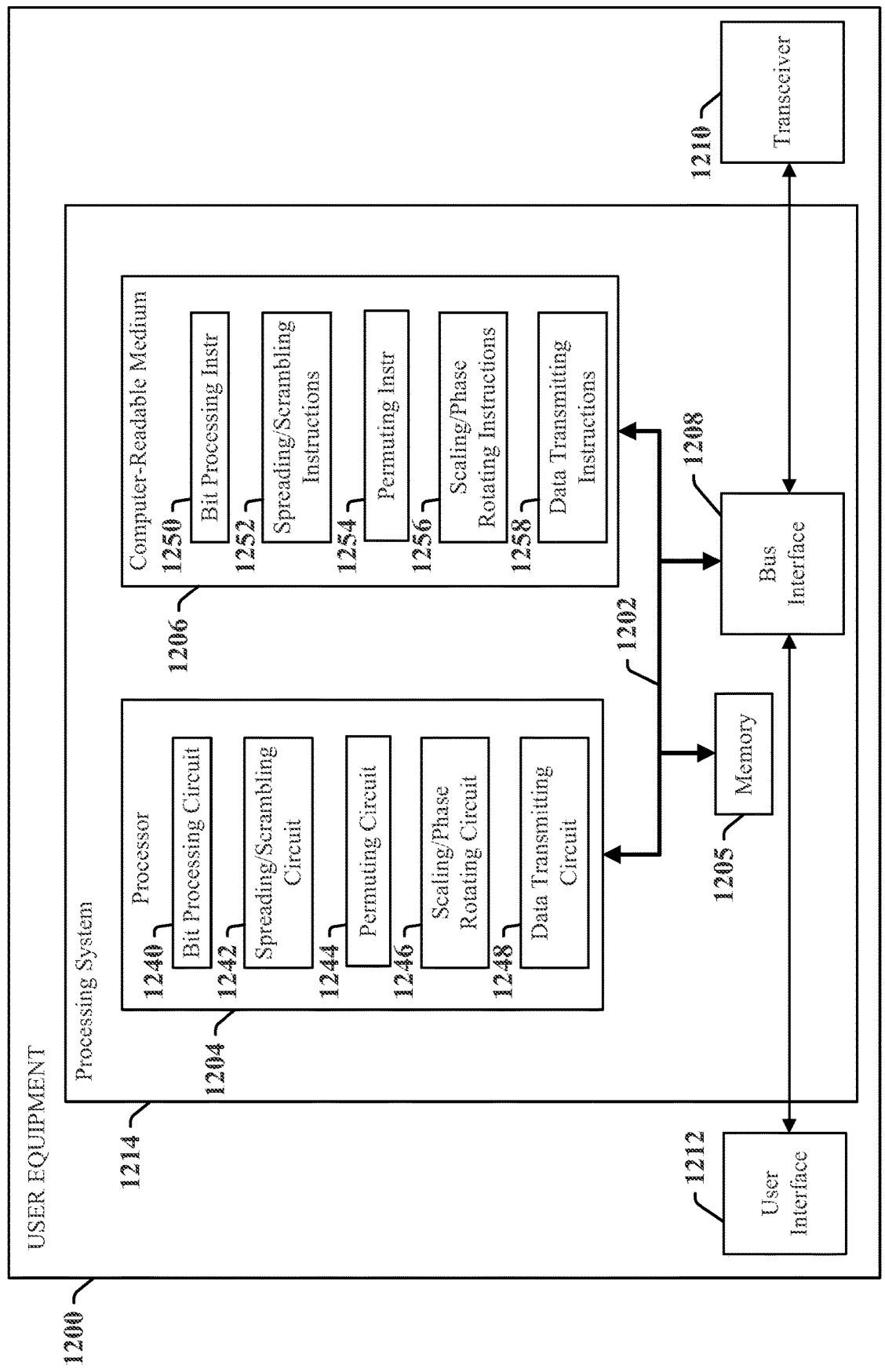
FIG. 12 is a block diagram conceptually illustrating an example of a hardware implementation for a user equipment (UE) according to some aspects of the disclosure.

FIG. 12 is a block diagram illustrating an example of a hardware implementation for a non-orthogonal multiple access (NOMA) user equipment (UE) or apparatus 1200 employing a processing system 1214. For example, the apparatus 1200 may be a UE as illustrated in any one or more of FIGS. 1, and/or 2.

The NOMA UE 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the NOMA UE 1200 may be configured to perform any one or more of the functions described herein. That is, the processor 1204, as utilized in a NOMA UE 1200, may be used to implement any one or more of the processes and procedures described below and illustrated in FIGS. 13 and 14.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, transceiver 1210, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided. Of course, such a user interface 1212 is optional, and may be omitted in some examples, such as a base station.

In some aspects of the disclosure, the processor 1204 may include bit processing circuitry 1240 configured for various functions, including, for example, demultiplexing a stream of bits into a plurality of layers, encoding each layer of demultiplexed bits with a different coding rate, and modulating each layer of encoded bits with a different modulation scheme to generate modulated symbols. For example, the bit processing circuitry 1240 may be configured to implement one or more of the functions described below in relation to FIG. 13, including, e.g., blocks 1302, 1304, and 1306, and in relation to FIG. 14, including, e.g., blocks 1402, 1404, and 1406. The processor 1204 may include spreading/scrambling circuitry 1242 configured for various functions, including, for example, spreading and scrambling each layer of modulated symbols with a different spreading code and a corresponding different scrambling code or spreading and scrambling summed symbols with a spreading code and a scrambling code. For example, the spreading/scrambling circuitry 1242 may be configured to implement one or more of the functions described below in relation to FIG. 13, including, e.g., block 1308, and in relation to FIG. 14, including, e.g., block 1414. The processor 1204 may include permuting circuitry 1244 configured for various functions, including, for example, permuting the plurality of layers having spread and scrambled symbols into a plurality of interleaved layers or permuting the plurality of layers having modulated symbols into a plurality of interleaved layers. For example, the permuting circuitry 1244 may be configured to implement one or more of the functions described below in relation to FIG. 13, including, e.g., block 1310, and in relation to FIG. 14, including, e.g., block 1408. The processor 1204 may include scaling/phase rotating circuitry 1246 configured for various functions, including, for example, scaling and phase rotating each interleaved layer of spread and scrambled symbols with a different scaling factor and a corresponding different phase rotating factor or scaling and phase rotating each interleaved layer of modulated symbols with a different scaling factor and a corresponding different phase rotating factor. For example, the scaling/phase rotating circuitry 1246 may be configured to implement one or more of the functions described below in relation to FIG. 13, including, e.g., block 1312, and in relation to FIG. 14, including, e.g., block 1410. The processor 1204 may include data transmitting circuitry 1248 configured for various functions, including, for example, summing the scaled and phase rotated symbols of the plurality of interleaved layers, mapping the summed symbols onto a set of resources allocated to the NOMA UE (or mapping the spread and scrambled symbols onto a set of resources allocated to the NOMA UE), and transmitting the mapped symbols via the set of resources. For example, the data transmitting circuitry 1248 may be configured to implement one or more of the functions described below in relation to FIG. 13, including, e.g., blocks 1314, 1316, and 1318, and in relation to FIG. 14, including, e.g., blocks 1412, 1416, and 1418.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable storage medium 1206 may include bit processing instructions 1250 configured for various functions, including, for example, demultiplexing a stream of bits into a plurality of layers, encoding each layer of demultiplexed bits with a different coding rate, and modulating each layer of encoded bits with a different modulation scheme to generate modulated symbols. For example, the bit processing instructions 1250 may be configured to implement one or more of the functions described below in relation to FIG. 13, including, e.g., blocks 1302, 1304, and 1306, and in relation to FIG. 14, including, e.g., blocks 1402, 1404, and 1406. The computer-readable storage medium 1206 may include spreading/scrambling instructions 1252 configured for various functions, including, for example, spreading and scrambling each layer of modulated symbols with a different spreading code and a corresponding different scrambling code or spreading and scrambling summed symbols with a spreading code and a scrambling code. For example, the spreading/scrambling instructions 1252 may be configured to implement one or more of the functions described below in relation to FIG. 13, including, e.g., block 1308, and in relation to FIG. 14, including, e.g., block 1414. The computer-readable storage medium 1206 may include permuting instructions 1254 configured for various functions, including, for example, permuting the plurality of layers having spread and scrambled symbols into a plurality of interleaved layers or permuting the plurality of layers having modulated symbols into a plurality of interleaved layers. For example, the permuting instructions 1254 may be configured to implement one or more of the functions described below in relation to FIG. 13, including, e.g., block 1310, and in relation to FIG. 14, including, e.g., block 1408. The computer-readable storage medium 1206 may include scaling/phase rotating instructions 1256 configured for various functions, including, for example, scaling and phase rotating each interleaved layer of spread and scrambled symbols with a different scaling factor and a corresponding different phase rotating factor or scaling and phase rotating each interleaved layer of modulated symbols with a different scaling factor and a corresponding different phase rotating factor. For example, the scaling/phase rotating instructions 1256 may be configured to implement one or more of the functions described below in relation to FIG. 13, including, e.g., block 1312, and in relation to FIG. 14, including, e.g., block 1410. The computer-readable storage medium 1206 may include data transmitting instructions 1258 configured for various functions, including, for example, summing the scaled and phase rotated symbols of the plurality of interleaved layers, mapping the summed symbols onto a set of resources allocated to the NOMA UE (or mapping the spread and scrambled symbols onto a set of resources allocated to the NOMA UE), and transmitting the mapped symbols via the set of resources. For example, the data transmitting instructions 1258 may be configured to implement one or more of the functions described below in relation to FIG. 13, including, e.g., blocks 1314, 1316, and 1318, and in relation to FIG. 14, including, e.g., blocks 1412, 1416, and 1418.

Figure 13:
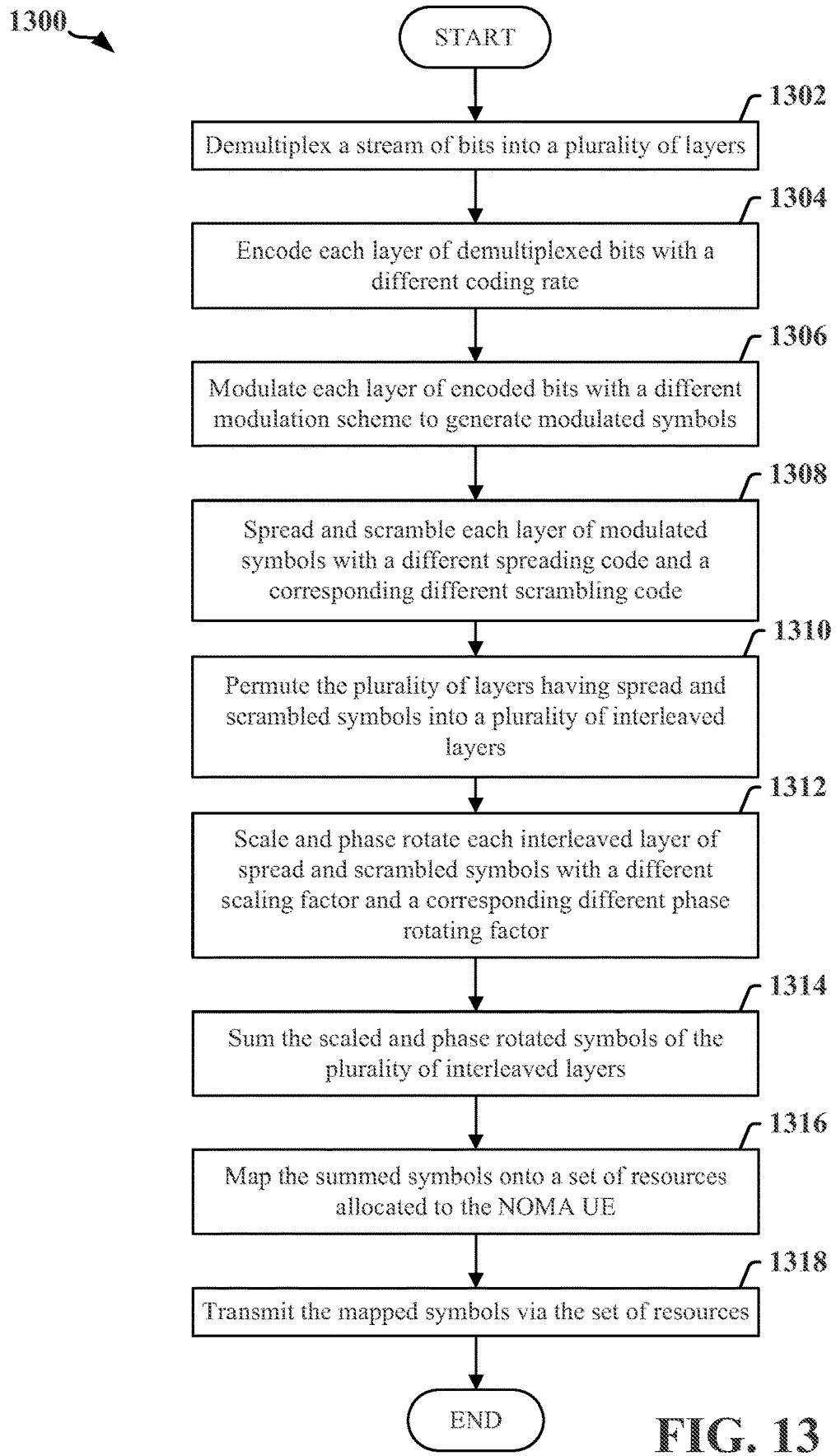
FIG. 13 is a flow chart illustrating an exemplary process for transmitting a signal in a multi-layer RSMA system in accordance with some aspects of the present disclosure.

FIG. 13 is a flow chart illustrating an exemplary process 1300 for transmitting a signal in a multi-layer resource spread multiple access (RSMA) system in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the NOMA UE 1200 illustrated in FIG. 12. In some examples, the process 1300 may be carried out by any suitable apparatus or means for carrying out the functions or algorithm described below.

At block 1302, the NOMA UE may demultiplex a stream of bits into a plurality of layers. The stream of bits may include information bits from a physical uplink data channel (e.g., PUSCH), a physical uplink control channel (e.g., PUCCH), and/or a combination of the physical uplink data channel and the physical uplink control channel. The information bits may be from different physical uplink channels and may be demultiplexed onto different layers. Moreover, the information bits may be from a single physical uplink channel (e.g., PUSCH or PUCCH) and may be demultiplexed onto different layers according to quality of service (QoS) requirements of the single physical channel. In an aspect, a number of the plurality of layers may be determined so as not to exceed a threshold. Furthermore, the number of the plurality of layers and/or the threshold may be included in a table (e.g., modulation and coding scheme (MCS) table) as part of a standard specification.

At block 1304, the NOMA UE may encode each layer of demultiplexed bits with a different coding rate. At block 1306, the NOMA UE may modulate each layer of encoded bits with a different modulation scheme to generate modulated symbols. At block 1308, the NOMA UE may spread and scramble each layer of modulated symbols with a different spreading code and a corresponding different scrambling code. In an aspect, coding rates, modulation schemes, spreading codes, and scrambling codes used to perform any of the operations above may be included in a table (e.g. MCS table) as part of a standard specification.

At block 1310, the NOMA UE may permute the plurality of layers having spread and scrambled symbols into a plurality of interleaved layers. In an aspect, the permuting of the plurality of layers having spread and scrambled symbols into the plurality of interleaved layers may be time-variant. In an aspect, the NOMA UE may perform the permuting operation using one permutation pattern. Alternatively, the NOMA UE may select different permutation patterns to perform the permuting operation. In a further aspect, permutation patterns used to perform the permuting operation may be included in a table (e.g. MCS table) as part of a standard specification.

At block 1312, the NOMA UE may scale and phase rotate each interleaved layer of spread and scrambled symbols with a different scaling factor and a corresponding different phase rotating factor. In an aspect, NOMA UE may select one phase rotating pattern or select different rotating patterns to perform the phase rotating operation. In a further aspect, scaling factors and phase rotating factors used to perform the scaling and phase rotating operation may be included in a table (e.g. MCS table) as part of a standard specification.

At block 1314, the NOMA UE may sum the scaled and phase rotated symbols of the plurality of interleaved layers. At block 1316, the NOMA UE maps the summed symbols onto a set of resources allocated to the NOMA UE. In an aspect, the set of resources is shared by another UE in a non-orthogonal manner Finally, at block 1318, the NOMA UE may transmit the mapped symbols via the set of resources.

In one configuration, the apparatus 1200 for wireless communication includes means for demultiplexing a stream of bits into a plurality of layers, means for encoding each layer of demultiplexed bits with a different coding rate, means for modulating each layer of encoded bits with a different modulation scheme to generate modulated symbols, means for spreading and scrambling each layer of modulated symbols with a different spreading code and a corresponding different scrambling code, means for permuting the plurality of layers having spread and scrambled symbols into a plurality of interleaved layers, means for scaling and phase rotating each interleaved layer of spread and scrambled symbols with a different scaling factor and a corresponding different phase rotating factor, means for summing the scaled and phase rotated symbols of the plurality of interleaved layers, means for mapping the summed symbols onto a set of resources allocated to the NOMA UE, and means for transmitting the mapped symbols via the set of resources. In one aspect, the aforementioned means may be the processor(s) 1204 shown in FIG. 12 configured to perform the functions recited by the aforementioned means. The means for transmitting the mapped symbols via the set of resources can further include, for example, transceiver 1210. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1 and/or 2, and utilizing, for example, the processes and/or algorithms described herein in relation to FIG. 13.

Figure 14:
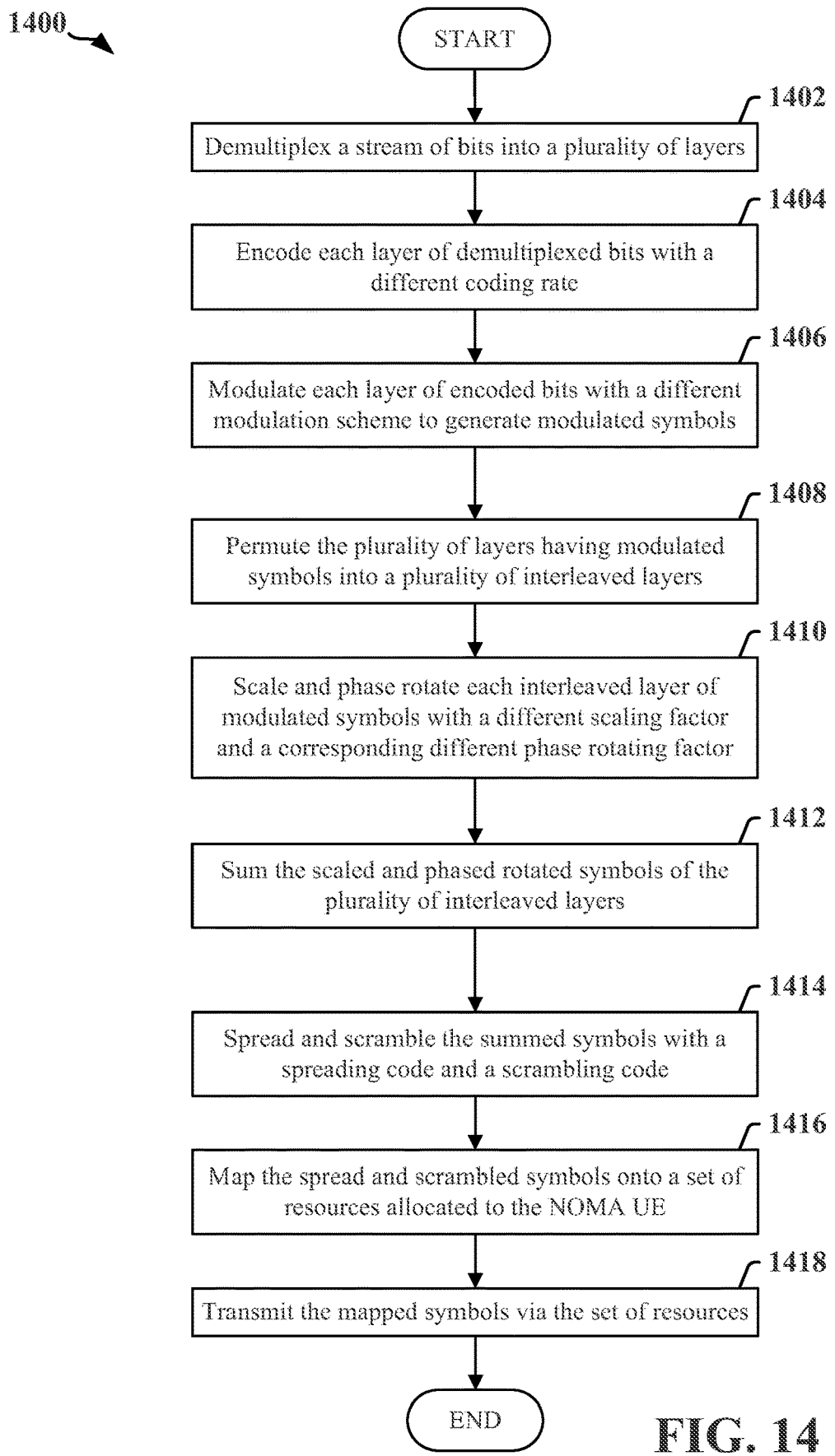
FIG. 14 is a flow chart illustrating another exemplary process for transmitting a signal in a multi-layer RSMA system in accordance with some aspects of the present disclosure.

FIG. 14 is a flow chart illustrating another exemplary process 1400 for transmitting a signal in a multi-layer resource spread multiple access (RSMA) system in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the NOMA UE 1200 illustrated in FIG. 12. In some examples, the process 1400 may be carried out by any suitable apparatus or means for carrying out the functions or algorithm described below.

At block 1402, the NOMA UE may demultiplex a stream of bits into a plurality of layers. The stream of bits may include information bits from a physical uplink data channel (e.g., PUSCH), a physical uplink control channel (e.g., PUCCH), and/or a combination of the physical uplink data channel and the physical uplink control channel. The information bits may be from different physical uplink channels and may be demultiplexed onto different layers. Moreover, the information bits may be from a single physical uplink channel (e.g., PUSCH or PUCCH) and may be demultiplexed onto different layers according to quality of service (QoS) requirements of the single physical channel. In an aspect, a number of the plurality of layers may be determined so as not to exceed a threshold. Furthermore, the number of the plurality of layers and/or the threshold may be included in a table (e.g., modulation and coding scheme (MCS) table) as part of a standard specification.

At block 1404, the NOMA UE may encode each layer of demultiplexed bits with a different coding rate. At block 1406, the NOMA UE may modulate each layer of encoded bits with a different modulation scheme to generate modulated symbols. In an aspect, coding rates and modulation schemes used to perform any of the operations above may be included in a table (e.g. MCS table) as part of a standard specification.

At block 1408, the NOMA UE may permute the plurality of layers having modulated symbols into a plurality of interleaved layers. In an aspect, the permuting of the plurality of layers having modulated symbols into the plurality of interleaved layers may be time-variant. In an aspect, the NOMA UE may perform the permuting operation using one permutation pattern. Alternatively, the NOMA UE may select different permutation patterns to perform the permuting operation. In a further aspect, permutation patterns used to perform the permuting operation may be included in a table (e.g. MCS table) as part of a standard specification.

At block 1410, the NOMA UE may scale and phase rotate each interleaved layer of modulated symbols with a different scaling factor and a corresponding different phase rotating factor. In an aspect, the NOMA UE may select one phase rotating pattern or select different rotating patterns to perform the phase rotating operation. In a further aspect, scaling factors and phase rotating factors used to perform the scaling and phase rotating operation may be included in a table (e.g. MCS table) as part of a standard specification.

At block 1412, the NOMA UE may sum the scaled and phase rotated symbols of the plurality of interleaved layers. At block 1414, the NOMA UE may spread and scramble the summed symbols with a spreading code and a scrambling code. The spreading code and the scrambling code may be specific to the NOMA UE. In an aspect, spreading codes and scrambling codes used to perform the operation above may be included in a table (e.g. MCS table) as part of a standard specification.

At block 1416, the NOMA UE may map the spread and scrambled symbols onto a set of resources allocated to the NOMA UE. In an aspect, the set of resources is shared by another UE in a non-orthogonal manner. Finally, at block 1418, the NOMA UE may transmit the mapped symbols via the set of resources.

In one configuration, the apparatus 1200 for wireless communication includes means for demultiplexing a stream of bits into a plurality of layers, means for encoding each layer of demultiplexed bits with a different coding rate, means for modulating each layer of encoded bits with a different modulation scheme to generate modulated symbols, means for permuting the plurality of layers having modulated symbols into a plurality of interleaved layers, means for scaling and phase rotating each interleaved layer of modulated symbols with a different scaling factor and a corresponding different phase rotating factor, means for summing the scaled and phase rotated symbols of the plurality of interleaved layers, means for spreading and scrambling the summed symbols with a spreading code and a scrambling code, means for mapping the spread and scrambled symbols onto a set of resources allocated to the NOMA UE, and means for transmitting the mapped symbols via the set of resources. In one aspect, the aforementioned means may be the processor(s) 1204 shown in FIG. 12 configured to perform the functions recited by the aforementioned means. The means for transmitting the mapped symbols via the set of resources can further include, for example, transceiver 1210. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1 and/or 2, and utilizing, for example, the processes and/or algorithms described herein in relation to FIG. 14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method operable at a non-orthogonal multiple access (NOMA) user equipment (UE) for transmitting a signal, the method comprising:
   demultiplexing a stream of bits into a plurality of layers;
   encoding each layer of demultiplexed bits with a different coding rate;
   modulating each layer of encoded bits with a different modulation scheme to generate modulated symbols;
   permuting the plurality of layers having modulated symbols into a plurality of interleaved layers;
   scaling and phase rotating each interleaved layer of modulated symbols with a different scaling factor and a corresponding different phase rotating factor;
   summing the scaled and phase rotated symbols of the plurality of interleaved layers; and
   mapping the summed symbols onto a set of resources allocated to the NOMA UE.

2. The method of claim 1, further comprising spreading and scrambling each layer of modulated symbols with a different spreading code and a corresponding different scrambling code prior to the permuting of the plurality of layers into the plurality of interleaved layers.

3. The method of claim 1, further comprising spreading and scrambling the summed symbols with a spreading code and a scrambling code prior to the mapping of the summed symbols onto the set of resources.

4. The method of claim 1, wherein the set of resources is shared by another UE in a non-orthogonal manner.

5. The method of claim 1, wherein the stream of bits includes information bits from at least one of:
   a physical uplink data channel;
   a physical uplink control channel; or
   a combination of the physical uplink data channel and the physical uplink control channel.

6. The method of claim 5, wherein the information bits are from different physical uplink channels and are demultiplexed onto different layers.

7. The method of claim 5, wherein the information bits are from a single physical uplink channel and are demultiplexed onto different layers according to quality of service (QoS) requirements of the single physical uplink channel.

8. The method of claim 1, wherein the permuting of the plurality of layers into the plurality of interleaved layers is time-variant.

9. The method of claim 1, further comprising transmitting the mapped symbols via the set of resources.

10. A non-orthogonal multiple access (NOMA) user equipment (UE) for transmitting a signal, comprising:
    means for demultiplexing a stream of bits into a plurality of layers;
    means for encoding each layer of demultiplexed bits with a different coding rate;
    means for modulating each layer of encoded bits with a different modulation scheme to generate modulated symbols;
    means for permuting the plurality of layers having modulated symbols into a plurality of interleaved layers;
    means for scaling and phase rotating each interleaved layer of modulated symbols with a different scaling factor and a corresponding different phase rotating factor;
    means for summing the scaled and phase rotated symbols of the plurality of interleaved layers; and
    means for mapping the summed symbols onto a set of resources allocated to the NOMA UE.

11. The NOMA UE of claim 10, further comprising means for spreading and scrambling each layer of modulated symbols with a different spreading code and a corresponding different scrambling code, wherein each layer of modulated symbols is spread and scrambled prior to the permuting of the plurality of layers into the plurality of interleaved layers.

12. The NOMA UE of claim 10, further comprising means for spreading and scrambling the summed symbols with a spreading code and a scrambling code, wherein the summed symbols are spread and scrambled prior to the mapping of the summed symbols onto the set of resources.

13. The NOMA UE of claim 10, wherein the set of resources is shared by another UE in a non-orthogonal manner.

14. The NOMA UE of claim 10, wherein the stream of bits includes information bits from at least one of:
    a physical uplink data channel;
    a physical uplink control channel; or
    a combination of the physical uplink data channel and the physical uplink control channel.

15. The NOMA UE of claim 14, wherein the information bits are from different physical uplink channels and are demultiplexed onto different layers.

16. The NOMA UE of claim 14, wherein the information bits are from a single physical uplink channel and are demultiplexed onto different layers according to quality of service (QoS) requirements of the single physical uplink channel.

17. The NOMA UE of claim 10, wherein the means for permuting is configured to permute the plurality of layers into the plurality of interleaved layers in a time-variant manner.

18. The NOMA UE of claim 10, further comprising means for transmitting the mapped symbols via the set of resources.

19. A non-orthogonal multiple access (NOMA) user equipment (UE) for transmitting a signal, comprising:
    at least one processor;
    a transceiver communicatively coupled to the at least one processor; and
    a memory communicatively coupled to the at least one processor, wherein the at least one processor is configured to:
    demultiplex a stream of bits into a plurality of layers, encode each layer of demultiplexed bits with a different coding rate, modulate each layer of encoded bits with a different modulation scheme to generate modulated symbols, permute the plurality of layers having modulated symbols into a plurality of interleaved layers, scale and phase rotate each interleaved layer of modulated symbols with a different scaling factor and a corresponding different phase rotating factor, sum the scaled and phase rotated symbols of the plurality of interleaved layers, and map the summed symbols onto a set of resources allocated to the NOMA UE.

20. The NOMA UE of claim 19, wherein the at least one processor is further configured to spread and scramble each layer of modulated symbols with a different spreading code and a corresponding different scrambling code prior to permuting the plurality of layers into the plurality of interleaved layers.

21. The NOMA UE of claim 19, wherein the at least one processor is further configured to spread and scramble the summed symbols with a spreading code and a scrambling code prior to mapping the summed symbols onto the set of resources.

22. The NOMA UE of claim 19, wherein the set of resources is shared by another UE in a non-orthogonal manner.

23. The NOMA UE of claim 19, wherein the stream of bits includes information bits from at least one of:
   a physical uplink data channel;
   a physical uplink control channel; or
   a combination of the physical uplink data channel and the physical uplink control channel.

24. The NOMA UE of claim 23, wherein the information bits are from different physical uplink channels and are demultiplexed onto different layers.

25. The NOMA UE of claim 23, wherein the information bits are from a single physical uplink channel and are demultiplexed onto different layers according to quality of service (QoS) requirements of the single physical uplink channel.

26. The NOMA UE of claim 19, wherein at least one processor is configured to permute the plurality of layers into the plurality of interleaved layers in a time-variant manner.

27. The NOMA UE of claim 19, wherein the at least one processor is further configured to transmit the mapped symbols via the set of resources.

28. A non-transitory computer-readable medium storing computer-executable code for transmitting a signal at a non-orthogonal multiple access (NOMA) user equipment (UE), comprising code for causing a computer to:

demultiplex a stream of bits into a plurality of layers;

encode each layer of demultiplexed bits with a different coding rate;

modulate each layer of encoded bits with a different modulation scheme to generate modulated symbols;

permute the plurality of layers having modulated symbols into a plurality of interleaved layers;

scale and phase rotate each interleaved layer of modulated symbols with a different scaling factor and a corresponding different phase rotating factor;

sum the scaled and phase rotated symbols of the plurality of interleaved layers;

map the summed symbols onto a set of resources allocated to the NOMA UE; and transmit the mapped symbols via the set of resources.

29. The non-transitory computer-readable medium of claim 28, wherein the code further causes the computer to spread and scramble each layer of modulated symbols with a different spreading code and a corresponding different scrambling code prior to permuting the plurality of layers into the plurality of interleaved layers.

30. The non-transitory computer-readable medium of claim 28, wherein the code further causes the computer to spread and scramble the summed symbols with a spreading code and a scrambling code prior to mapping the summed symbols onto the set of resources.

* * * * *